United States Patent
Singh et al.

(10) Patent No.: US 7,221,652 B1
(45) Date of Patent: May 22, 2007

(54) SYSTEM AND METHOD FOR TOLERATING DATA LINK FAULTS IN COMMUNICATIONS WITH A SWITCH FABRIC

(75) Inventors: Sushil Kumar Singh, San Diego, CA (US); Kenneth Yi Yun, San Diego, CA (US); Jianfeng Shi, Encinitas, CA (US); Eli James Aubrey Fernald, San Diego, CA (US); Kirk Alvin Miller, San Diego, CA (US); Prayag Bhanubhai Patel, San Diego, CA (US); Ayoob Eusoof Dooply, San Diego, CA (US); George Beshara Bendak, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1008 days.

(21) Appl. No.: 10/378,480

(22) Filed: Mar. 3, 2003

Related U.S. Application Data

(63) Continuation-in-part of application No. 10/035,835, filed on Dec. 24, 2001, now Pat. No. 7,020,131, and a continuation-in-part of application No. 10/029,581, filed on Dec. 20, 2001, and a continuation-in-part of application No. 10/022,673, filed on Dec. 17, 2001, now Pat. No. 7,079,545, and a continuation-in-part of application No. 10/023,266, filed on Dec. 14, 2001, now abandoned.

(51) Int. Cl.
*G01R 31/08* (2006.01)
(52) U.S. Cl. .................. 370/242; 370/390
(58) Field of Classification Search ........... 370/242, 370/218, 229, 235, 390; 714/4; 398/19; 710/317
See application file for complete search history.

(56) References Cited

U.S. PATENT DOCUMENTS

| | | | | |
|---|---|---|---|---|
| 5,872,904 A | * | 2/1999 | McMillen et al. | 714/4 |
| 6,055,599 A | * | 4/2000 | Han et al. | 710/317 |
| 6,067,286 A | * | 5/2000 | Jones et al. | 370/218 |
| 6,515,991 B1 | * | 2/2003 | McKeown | 370/390 |
| 6,721,273 B1 | * | 4/2004 | Lyon | 370/235 |
| 7,042,842 B2 | * | 5/2006 | Paul et al. | 370/229 |
| 2003/0026267 A1 | * | 2/2003 | Oberman et al. | 370/397 |
| 2006/0182440 A1 | * | 8/2006 | Stefanov et al. | 398/19 |

* cited by examiner

*Primary Examiner*—Chi Pham
*Assistant Examiner*—Albert T. Chou
(74) *Attorney, Agent, or Firm*—Law Office of Gerald Maliszewski; Gerald Maliszewski

(57) ABSTRACT

A system and method are provided for tolerating data line faults in a packet communications network. The method comprises: serially transmitting information packets from at least one traffic manager (TM); at a switch fabric, accepting information packets at a plurality of ingress ports, the information packets addressing destination port card egress ports; selectively connecting port card ingress ports to port card egress ports; serially supplying information packets from a plurality of port card egress ports; sensing a connection fault between the switch fabric and the TM; and, in response to sensing the fault, reselecting connections between the switch fabric port card ports and the TM. Some aspects comprise: an ingress memory subsystem (iMS) receiving cells on an ingress port exceeding an error threshold. Then, reselecting connections between the port card ports and the TM includes the iMS sending a message to the iTM identifying the faulty ingress connection.

14 Claims, 15 Drawing Sheets

Fig. 9

| S8905 MS (INGRESS) | | | | | S8905 MS (EGRESS) | | |
|---|---|---|---|---|---|---|---|
| | IN | OUT | | | IN | OUT | |
| INGRESS CHANNEL 0 | 0<br>1<br>2<br>3<br>4<br>5<br>6<br>7<br>8<br>9 | 0<br>1<br>2<br>3<br>4<br>5<br>6<br>7<br>8<br>9 | BACKPLANE CHANNEL 0 | BACKPLANE CHANNEL 0 | 0<br>1<br>2<br>3<br>4<br>5<br>6<br>7<br>8<br>9 | 0<br>1<br>2<br>3<br>4<br>5<br>6<br>7<br>8<br>9 | EGRESS CHANNEL 0 |
| INGRESS CHANNEL 1 | 10<br>11<br>12<br>13<br>14<br>15<br>16<br>17<br>18<br>19 | 10<br>11<br>12<br>13<br>14<br>15<br>16<br>17<br>18<br>19 | BACKPLANE CHANNEL 1 | BACKPLANE CHANNEL 1 | 10<br>11<br>12<br>13<br>14<br>15<br>16<br>17<br>18<br>19 | 10<br>11<br>12<br>13<br>14<br>15<br>16<br>17<br>18<br>19 | EGRESS CHANNEL 1 |
| INGRESS CHANNEL 2 | 20<br>21<br>22<br>23<br>24<br>25<br>26<br>27<br>28<br>29 | 20<br>21<br>22<br>23<br>24<br>25<br>26<br>27<br>28<br>29 | BACKPLANE CHANNEL 2 | BACKPLANE CHANNEL 2 | 20<br>21<br>22<br>23<br>24<br>25<br>26<br>27<br>28<br>29 | 20<br>21<br>22<br>23<br>24<br>25<br>26<br>27<br>28<br>29 | EGRESS CHANNEL 2 |
| INGRESS CHANNEL 3 | 30<br>31<br>32<br>33<br>34<br>35<br>36<br>37<br>38<br>39 | 30<br>31<br>32<br>33<br>34<br>35<br>36<br>37<br>38<br>39 | BACKPLANE CHANNEL 3 | BACKPLANE CHANNEL 3 | 30<br>31<br>32<br>33<br>34<br>35<br>36<br>37<br>38<br>39 | 30<br>31<br>32<br>33<br>34<br>35<br>36<br>37<br>38<br>39 | EGRESS CHANNEL 3 |

SYSTEM AND METHOD FOR TOLERATING DATA LINK FAULTS IN COMMUNICATIONS WITH A SWITCH FABRIC

RELATED APPLICATIONS

This application is a continuation-in-part of a pending application entitled, SYSTEM AND METHOD FOR SWITCHING VARIABLY SIZED INFORMATION GROUPS, invented by Yun et al., Ser. No. 10/023,266, filed Dec. 14, 2001 now abandoned.

This application is a continuation-in-part of a pending application entitled, SYSTEM AND METHOD FOR SIMULTANEOUS DEFICIT ROUND ROBIN PRIORITIZATION, invented by Yun et al., Ser. No. 10/022,673, filed Dec. 17, 2001 now U.S. Pat. No. 7,079,545.

This application is a continuation-in-part of a pending application entitled, SYSTEM AND METHOD FOR GRANTING ARBITRATED BIDS IN THE SWITCHING OF INFORMATION, invented by Yun et al., Ser. No. 10/029,581, filed Dec. 20, 2001.

This application is a continuation-in-part of a pending application entitled, SYSTEM AND METHOD FOR HIERARCHICAL SWITCHING, invented by Yun et al., Ser. No. 10/035,835, filed Dec. 24, 2001 now U.S. Pat. No. 7,020,131.

BACKGROUND OF THE INVENTION

1. Field of the Invention

This invention generally relates to packet communications switching and, more particularly, to a system and method for tolerating data line faults in a packets communications network connected to a switch fabric.

2. Description of the Related Art

There is industry demand for integrated circuits (ICs) switching systems that can be easily scaled for Network Access, the Network Edge, or a Core Switch Router, at the high end. SCSA (Signal Computing System Architecture) defines a switch fabric to be the facility for connecting any two (or more) transmitting or receiving Service Providers.

FIG. 18 is a schematic block diagram of a general switch fabric system (prior art). Traffic enters the system on the ingress side (the left side of the figure). Traffic exits the system on the egress side (the right side of the figure). The port card ingress and egress structures are sometimes subdivided into channels and subchannels. The packet headers specify a required destination port card, channel, and subchannel. The system must synchronously route each ingress packet to the correct egress destination.

Packets are converted into frames by ingress traffic managers (iTMs). A frame is a logical unit of data, which is often a small piece of a much larger data set such as a file or image. The iTMs feed the ingress side of the fabric. The switch fabric might convert the frame format to a "native" format, and then on egress, convert the data back into the TM frame format before sending the data to the egress traffic managers (eTMs). If the frames are fixed size (for example: 53 bytes, 64 bytes, or 80 bytes), the frames are often called cells.

Protocol Specific vs. Protocol Agnostic

A switch fabric can be protocol specific or protocol agnostic. An example of a protocol specific switch fabric would be a system designed and optimized specifically for asynchronous transfer mode (ATM) traffic. Another example would be a switch that handles only TCP/IP traffic. The obvious disadvantage of a switch fabric hardwired to handle a specific protocol is lack of flexibility. Service providers want to sell services to a variety of customers in various industries. Protocols vary from industry to industry.

Even within one protocol type, there can be protocol upgrades. For example, TCP/IP, the machine language of Internet routers, now runs primarily "IPv4." This protocol, successful as it has been, has a lack of available addresses, poor security features, and no "quality of service" (QoS) provisions. The next generation Internet protocol is "IPv6." It provides solutions to these limitations.

A protocol agnostic switch fabric works equally well with all protocol types, however, the traffic manager must be responsible for recognizing specific protocol types. The disadvantage of a protocol agnostic switch fabric is that it may be more complicated, and perhaps slower than a switch fabric dedicated to a particular protocol.

Packet Striping vs. Single Link per Packet

The simplest way for a traffic manager to transmit a packet into a switch fabric is to transmit the packet serially along one line. Striping is a way of achieving higher bandwidth by transmitting a single packet across multiple ingress/egress lines. For example, a TM can transmit a packet into a switch fabric eight times as fast if the packet is sliced into eight pieces (stripes) by the TM, and conveyed into the fabric along 8 parallel lines simultaneously. The fabric captures the packet in memory, routes it to the required egress destination, and slices the packet into 8 parallel lines before transmitting the packet to the egress TM.

The upside to packet striping is the potential for lower latency. There are several negative aspects of packet striping:

if one of the links is damaged (1 of 8 in the example above), the entire channel is out of service, degrading fault tolerance; and, the interface between the TM and switch fabric is more complicated. Circuitry must be used to slice the packet into stripes and reassemble it into packets.

Single-Cell Packet vs. Multi-Cell Packets

Many switch fabrics now deployed and passing revenue traffic, especially in wide area networks (WANs), use asynchronous transfer mode (ATM) packets. ATM packets are single-cell packets, with a fixed cell size of 53 bytes, 48 bytes of which is the information payload. The ATM specification evolved in the 1980s and early 1990s. It was then believed that variable length (multi-cell) packets would be too difficult to implement at rates needed for wire-speed traffic. The single-cell solution was a compromise that would work for voice data, video data, multimedia data, email data, file data, etc. With a fixed frame size, switch designs are simplified and ultimately faster.

However, files are better sent in large frames. Voice switching performs better with small bursts of data, corresponding to analog-to-digital converter time slots. Large frames and concomitant switching latencies can render a switch useless for most 2-way voice applications. Voice communications require low latency (time delay). Since ATM had to work for all network data, the small payload (voice) requirements prevailed at the expense of the large frame applications.

For large frames or packets it is much more efficient to establish a path from an ingress port card to the required egress destination, and then leave this path undisturbed until the packet is completed. With single cell packets, the ingress port card must bid for, accept grants, and then schedule each cell of a multi-cell packet.

There are also Frame Relay switch fabrics. Frame Relay is a single-cell protocol, albeit with frame size ranging from 6 to 4096 bytes. Such switch fabrics have been deployed and passing revenue traffic since the early 1990s. These switch fabrics have generally not been used for voice data because of the large latency. Only highly compressed voice traffic works well over frame relay. Voice-over-frame relay was added as an afterthought by network engineers. Frame relay excels at data communications such as local area network internetworking (LAN-to-LAN). Such communications are very high speed and bursty, with non-critical latency constraints.

Cut-Through vs. Store-and-Forward

The conventional method of switch fabric packet routing is called Store-and-Forward. In this method, the switch fabric accepts an input packet and buffers the packet on the ingress side of the fabric, making sure the packet was received intact, knowing the exact number of cells in the packet. The problem with the store-and-forward method is the added latency of buffering the packet. In Cut-through Packet Routing (CPR), a switch fabric is able to send the incoming packet cells to the correct egress port as soon as the destination address is known.

Memory-Based vs. Arbitrated Crossbar

A switch fabric can use memory-based crossbars or arbitrated crossbars. A memory-based crossbar is sometimes called a "shared memory switch." Ingress packets flow from the port cards into a huge memory bank, which serve as the switch. From the memory bank, the destination address is determined from egress port destination information in the cell headers. The problem with these switch fabrics is that they become prohibitively expensive and large from all the required high-speed memory. Such fabrics cannot be used to reach terabit total switching speeds with technology available today.

It would be advantageous if a switch fabric could use arbitrated crossbars to reduce the need for high-speed memory.

It would be advantageous if a switch fabric could use Cut-through packet routing to reduce latency.

It would be advantageous if a switch fabric could handle multi-cell packets, so as to switch larger-sized packets with a reduced latency.

It would be advantageous if a switch fabric could use a single-link for each packet, to improve the system fault tolerance and simplify the interface to a TM.

It would be advantageous if the above-mentioned switch fabric could operate protocol agnostic.

It would be advantageous if the above-mentioned switch fabric could tolerate data link faults to interfacing ingress and egress TMs.

SUMMARY OF THE INVENTION

Accordingly, a method is provided for tolerating data link faults in communications with a switch fabric, the method comprises: serially transmitting information packets including a plurality of cells from at least one traffic manager (TM); at a switch fabric, accepting information packets at a plurality of port card ingress ports, the information packets addressing a plurality of destination port card egress ports; selectively connecting port card ingress ports to port card egress ports; serially supplying information packets from a plurality of port card egress ports; sensing a connection fault between the switch fabric and the TM; and, in response to sensing the fault, reselecting connections between the switch fabric port card ports and the TM.

In some aspects of the method, selectively connecting port card ingress ports to port card egress ports includes: each port card accepting packets on a plurality of ingress data links, through a corresponding plurality of port card ingress ports, from at least one ingress TM (iTM); storing the accepted packets in a port card ingress memory subsystem (iMS); assigning packets to a plurality of port card backplane data links; and, supplying assigned packets to a crossbar.

Then, sensing a connection fault between the switch fabric and the TM includes the iMS receiving cells on an ingress port exceeding an error threshold. Reselecting connections between the port card ports and the TM includes the iMS sending a message to the iTM identifying the faulty ingress connection. Data link fault tolerance is enacted in a similar manner, when the fault is associated with the switch fabric egress ports.

Additional details of the above-described method, and a system for tolerating data line faults in a packet communications network are provided below.

BRIEF DESCRIPTION OF THE DRAWINGS

FIG. 9 is a diagram illustrating link to channel assignments.

DETAILED DESCRIPTION OF THE PREFERRED EMBODIMENTS

Figure 1:
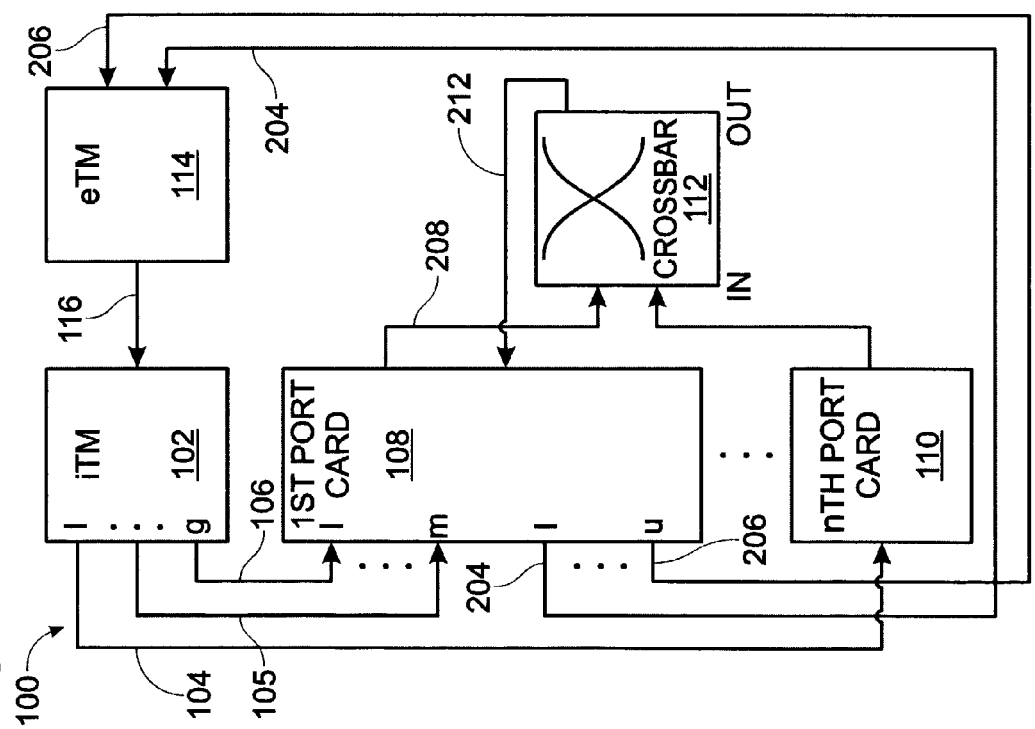
FIG. 1 is a schematic block diagram of the present invention system for tolerating data line faults in a packet communications network.

FIG. 1 is a schematic block diagram of the present invention system for tolerating data link faults in communications with a switch fabric. The system 100 comprises at least one ingress traffic manager 102 (iTM) with a plurality of ports 1 through g, serially transmitting information packets, including a plurality of cells, on a corresponding plurality of serial data lines 104 through 106. The value of g is not limited to any particular value. The system 100 further comprises a plurality of switch fabric port cards 1 (first port card 108) through n (nth port card 110), where n is not limited to any particular value.

Figure 2:
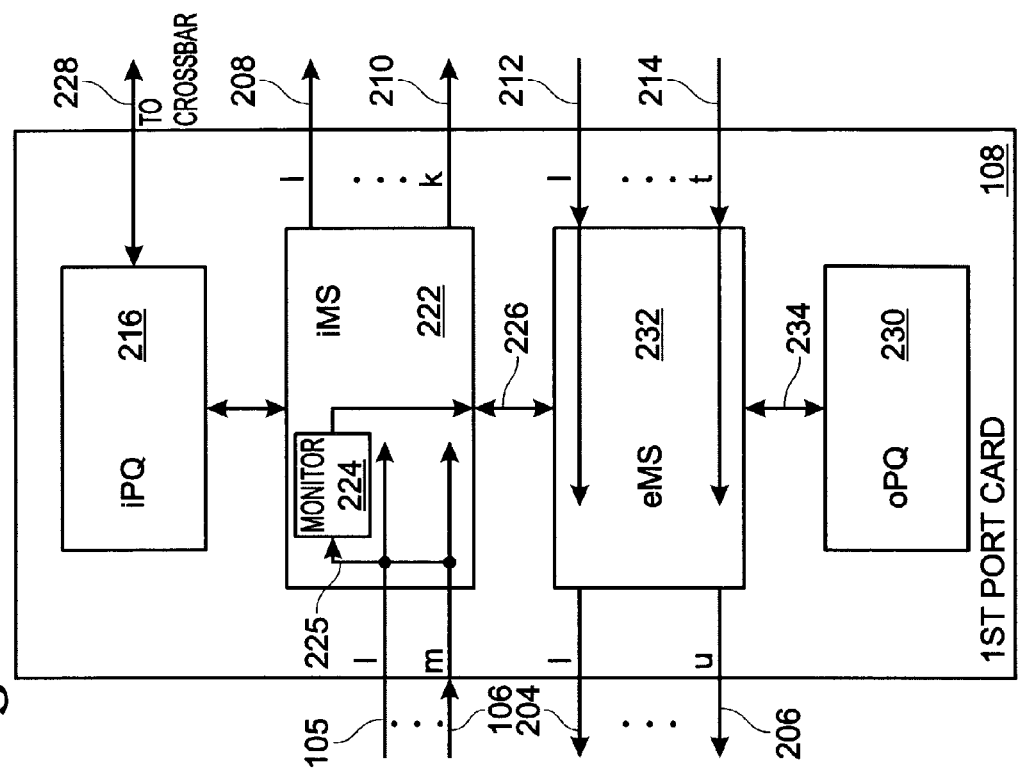
FIG. 2 is a schematic block diagram illustrating the first port card of FIG. 1 in greater detail.

FIG. 2 is a schematic block diagram illustrating the first port card 108 of FIG. 1 in greater detail. Each port card, as exemplified by the first port card 108 includes a sixth plurality of ingress ports 1 through m on lines 105 through 106, respectively. The first port card 108 has connections on a corresponding sixth plurality of ingress data links, to accept packets from one or more iTMs. Returning briefly to FIG. 1, note that although the first port card 108 is only shown connected to iTM 102, in other aspects of the system 100, the first port card 108 may have ingress port connected to a plurality of iTMs (not shown). As explained in more detail below, there is typically more than one connection between an iTM and the port card ingress ports to realize the fault tolerance benefits of the invention.

In FIG. 2, the first port card 108 is shown with a plurality of egress ports 1 through u having connections on the corresponding plurality of egress data links 204 through 206, respectively. Returning to FIG. 1, note that although the first port card 108 is only shown connected to an egress TM (eTM) 112, in other aspects of the system 100, the first port card 108 may have egress port connected to a plurality of eTMs (not shown). Again, there is typically more than one connection between an eTM and the port card egress ports to realize the fault tolerance benefits of the invention.

Returning to FIG. 2, in can be seen that the first port card 108 performs both ingress and egress functions. However, not all port cards must be so enabled. In other aspects of the system, some port cards may be enabled just to provide an ingress function, or just to provide an egress function.

A plurality of backplane data links transfers packets between port cards. Shown are a second plurality of ingress backplane data links 1 through k on lines 208 through 210, respectively. Egress backplane data links 1 through t are associated with lines 212 through 214, respectively.

An ingress memory subsystem (iMS) 222 has inputs connected to the ingress ports on lines 105 through 106 (1 through m) to receive fault messages. As explained below, the fault messages are included in the headers of packets. The iMS 222 has outputs on lines 208 through 210 (1 through k) to supply packets to ingress backplane data links. A control link 226 communicates flow control information. An egress MS (eMS) 232 has outputs connected to the egress ports on lines 204 through 206 (1 through u) to supply fault messages, in packet headers, and inputs on lines 212 through 214 (1 through t) to accept packets on egress backplane data links. The eMS 232 has a control link on line 226, connected to the iMS to communicate (receive) flow control information.

Returning to FIG. 1, the iMS 222 passes an error message, through intervening elements, to the iTM 102. The iTM 102 reselects a port transmitting packets to the port card ingress ports in response to the received fault messages. For example, if the iTM 102 was transmitting packets on line 104, and then receives an error message indicating a fault in that link, the iTM may select line 106 for subsequent communications. Returning to FIG. 2, that an ingress PQ (iPQ) 216 supplies backplane data link transfer commands to the iMS 222. The iMS 222 includes a monitor 224 with an input on line 225 to receive packets from the ingress ports and an output connected to line 226 to supply an error message to the eMS 232 in flow control communications, in response to the packets errors exceeding an error threshold.

The iPQ 216 has a control link on line 228 operatively connected to a corresponding crossbar 220 controlling the inter-port card transfer of packets on the ingress backplane data links. More specifically, the crossbar is part of a backplane that includes switchplane banks, switchplanes, and switch parts (not shown). Each switch card typically includes a plurality of crossbars controlled by an arbiter that maintains a control link with the iPQ. Additional details of the backplane switching mechanism are provided in Functional Description Section, below.

The egress function of the first port card 108 is analogous to the ingress function. The first port card 108 has a plurality of egress ports 1 through u with connections to a corresponding plurality of egress data links 204 through 206, to supply packets to at least one eTM. The ingress ports 1 through m are operatively connected to the eTM 114, typically through intervening switch cards and egress portion of other port cards. As used herein, "operatively connected" means indirectly connected or connected through an intervening element. Likewise, the first port cards egress data links are operatively connected to the first port card ingress data links, and therefore the iMS 222, via the eTM 114 and the iTM 102. For example, the first card eMS 232 operatively accepts error messages from the eTM and reselects an egress port transmitting packets to the eTM 114 in response to the received fault messages.

Again, the first port card 108 supplies packets on up to a sixth plurality of egress data links 204 through 206, through a corresponding sixth plurality of port card egress ports 1 through u, to one or more eTMs, see FIG. 1, reference designator 114.

Likewise, the first port card 108 includes an oPQ 230 and an egress memory system 232 (eMS). The eMS 232 has an input connected to a second plurality of egress backplane data links 1 through t (lines 212 through 214) to accept packets for storage, an input on line 234 to accept transfer commands from the oPQ 230, and an output on line 234 to supply packets to the egress ports in response to the transfer commands. Again, it is typical that the error messages are added to packet overhead.

A port card data bus operatively connects oPQ 230 and iPQ 216. The oPQ 230 relays control communications for controlling the inter-port card transfer of packets on the egress backplane data links through the iPQ 216.

Viewing both FIGS. 1 and 2, fault tolerance associated with the switch fabric ingress functions may occur as follows. After receiving an error message from the iMS monitor 224, indicating a fault associated with line 105, the iMS 222 sends a flow control fault message to the iTM 102 identifying the faulty ingress connection, via communications through the eMS 232 and the eTM 114. The eMS 232 accepts the fault message from the iMS 222 and transmits the fault message to the eTM 114 on line 204. The eTM 114 accepts the fault message and transmits the fault message to the iTM 102 on line 116. Note that line 116 may be a dedicated control link or a packet data communications data line. Then, the iTM 102 reselects ports communicating packets to the port card ingress ports in response to the fault message. For example, the iTM begins to use line 106 instead of line 105.

Likewise, the invention provides for tolerance in the data link connections associated with a switch fabric port card egress function. The eTM 114 may receive packet cells from a port card egress port exceeding an error threshold, on line 204 from the first port card 108 for example. In response, the eTM 114 sends a message to the first port card eMS 232 identifying the faulty egress connection.

More specifically, the eTM 114 sends a fault message to the iTM 102 on line 116 identifying the port card faulty egress connection. In this example, the faulty connection is associated with line 204. Note that the data link fault may be due a fault in first port egress function, the link itself, or the import function of the eTM 114. The iTM 102 accepts the fault massage and sends the fault message to the first port card iMS 222 identifying the faulty ingress connection. Typically, the message is in the header of a traffic channel packet. Alternately, the communication can be made via dedicated control channels (not shown), or via control link communications with the switch fabric switch cards. The iMS 222 accepts the fault message and transmits the fault message, via line 226, to the eMS 232. The eMS 232 receives the fault message and reselects egress ports communicating packets to the eTM in response to the fault message. For example, line 206 is used for communications with the eTM 114, instead of line 204. More specifically, the eMS 232 uses a lock signal communication to prohibit the oPQ 230 from selecting the faulty link, as the oPQ is directly responsible for managing the port card egress ports. Because the faulty link cannot be selected by the oPQ 230, the oPQ must select a different egress port for eTM communications. In this manner, the eMS 232, through the intervening action of the oPQ 230, reselects an egress port.

Functional Description

The Applied Micro Circuits Corporation (AMCC)S8005 Cyclone™ series is a specific embodiment of the above-described present invention series. The Cyclone series is a highly integrated, low power, area efficient chip set that implements a high-capacity switching fabric that seamlessly handles both packet and TDM (time division multiplexed) traffic. Details of this specific embodiment are presented below to clarify some of the system aspects described above. The switch fabric processes all types of packet traffic (ATM, MPLS, IP, etc.). The system switch fabric is based on a set of four highly integrated ICs which contain SERDES and memory in order to reduce the overall system power, routing complexity, and required board area. The chip set consists of the following chips:

S8505 Priority Queue (PQ);
S8605 Arbiter/Crossbar;
S8805 Earliest Deadline First Queue (EDFQ); and,
S8905 Memory Subsystem (MS).

The port cards described above could be a single device including the PQ, MS, and EDFQ chip functions.

The Cyclone switch fabric implementation is "protocol agnostic," meaning the chips can process all types of packet traffic (Fibre Channel, ATM, MPLS, IPv4, IPv6, etc.) equally well. The focus of the Cyclone system is to optimize switching performance in terms of throughput, latency, switch capacity, and scalability.

Generally, the Cyclone fabric does not use striping. It does support a striped cell format (ViX-v3) when used in conjunction with certain traffic managers. However, even when the Cyclone fabric used ViX-v3 packets at the ingress or egress, the routing of the packets through the crossbars is still done along a single link per packet.

Cyclone solves the problems associated with ATM and Frame Relay by using fixed frame size (64 byte or 80 byte cells, constant for each switch fabric). For extremely low latency voice applications, such as voice over IP (VoIP), packets consist of one or two cells. For high speed data communications, packet sizes can be as large as 192 cells (15,360 bytes if 80-byte cells are used). In either case, the fixed cell size allows the fabric to be fast. Because the Cyclone solution is "cut-through", latency is kept to an absolute minimum.

The Cyclone method of cut-through packet routing minimizes latency. Service providers have delay budgets and often need to be able to offer very low latency to certain customers. A store-and-forward approach simply would not meet these needs. The only downside to cut-through switching is it places the additional burden of packet integrity checking on the traffic managers. This is usually handled by means of a cyclic redundancy check (CRC). The iTM calculates the required CRC byte(s) based on the data in a packet. The CRC is recalculated by the eTM to verify correct transmission.

The arbitrated crossbar method, used in the Cyclone system, is more complicated because it requires a centralized arbitration mechanism. But this method allows better scaling of the switch fabric from a small 20 Gbit/sec fabric to a large 1.2 Gbit/sec system.

Figure 3:
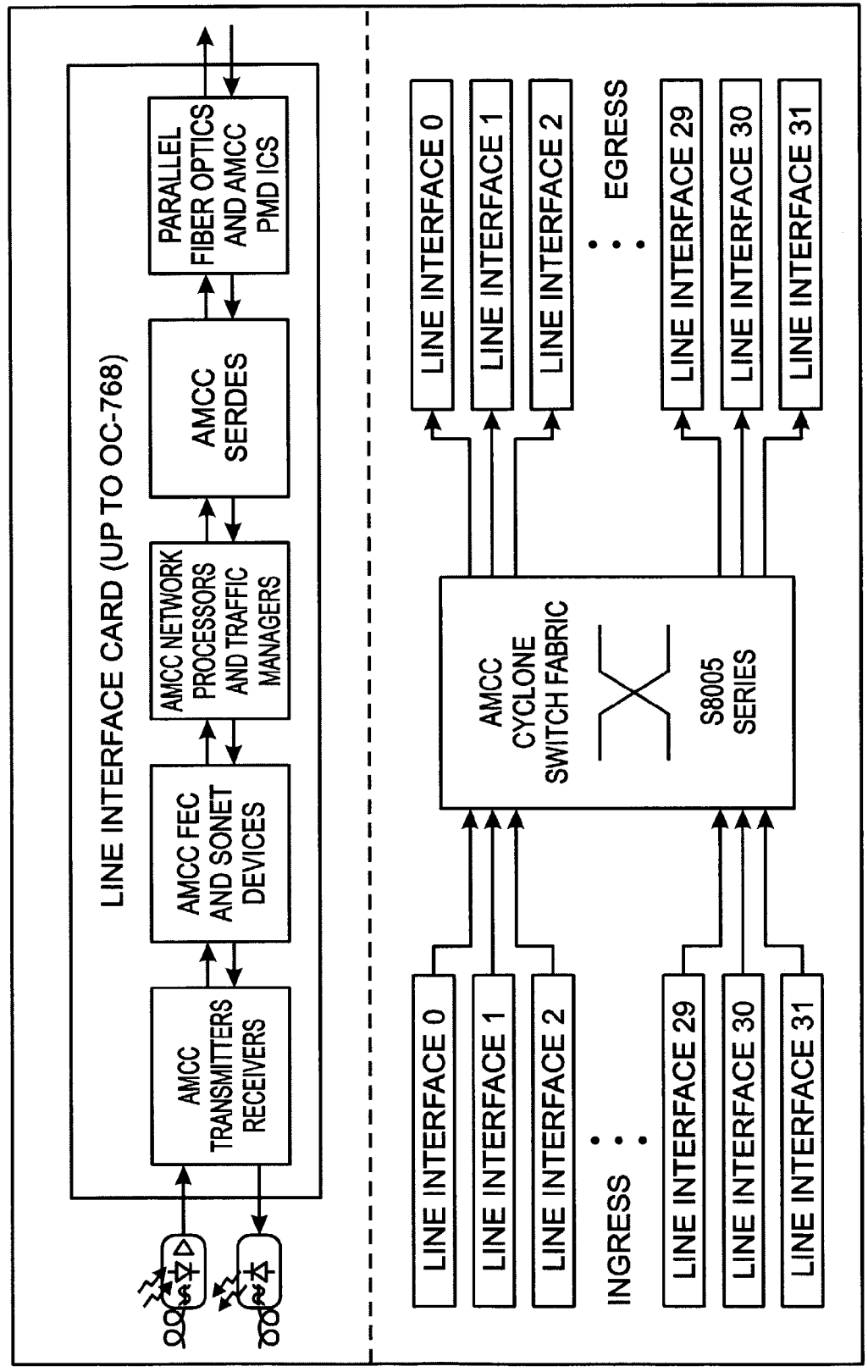
FIG. 3 is a schematic block diagram depicting a packet communications network utilizing the present invention switch fabric.

FIG. 3 is a schematic block diagram depicting a packet communications network utilizing the present invention switch fabric. Traffic management is integrated into the switch fabric and occurs at the ingress, switching, and egress in order to guarantee quality of service (QoS). The switch fabric is scalable and can terminate up to 128 OC-192's (1.28 Tbps). The system can be organized as a 32×32 port switch where each port consists of four OC-192 channels, in effect implementing a 128×128 switch. The OC-192's can be either channelized or concatenated. The fabric can also be thought of as a 512×512 switch since each channel can be treated as four OC-48 subchannels. In addition to the port cards, there are up to 16 switching cards (depending on the chosen architecture and organization), which consist of arbiters and crossbars. Each switching card has connections to all the port cards.

All traffic is cellularized, whether TDM or best-effort type traffic. The interface into and out of the switch fabric passes cells over 2.5 Gbps serial links, which include 8B/10B encoding. Each channel of the switch fabric consists of up to ten serial links, providing up to 20 Gbps data rate throughput.

Port cards provide the traffic interface into the switch fabric. Port cards can be architected such that the line interface (optics, Phy.'s, framers), network processing, and traffic management are on the same card, or they can be architected to be on separate cards. A port card's configuration is dependent on the desired chassis architecture and the number of chips needed.

The three basic types of port cards are single channel (10G or OC-192), two channel (20G or 2xOC-192), and four channel (40G or 4xOC-192). The different types of port cards are normally not mixed in the same chassis because the backplane and switch cards would have to be built to support the largest case. When all of the cards are of the same type, there are optimizations that can be done (depending on the required bandwidth), to reduce the number of switch cards or crossbars on those cards, and hence the number of traces on the backplane.

Figure 4:
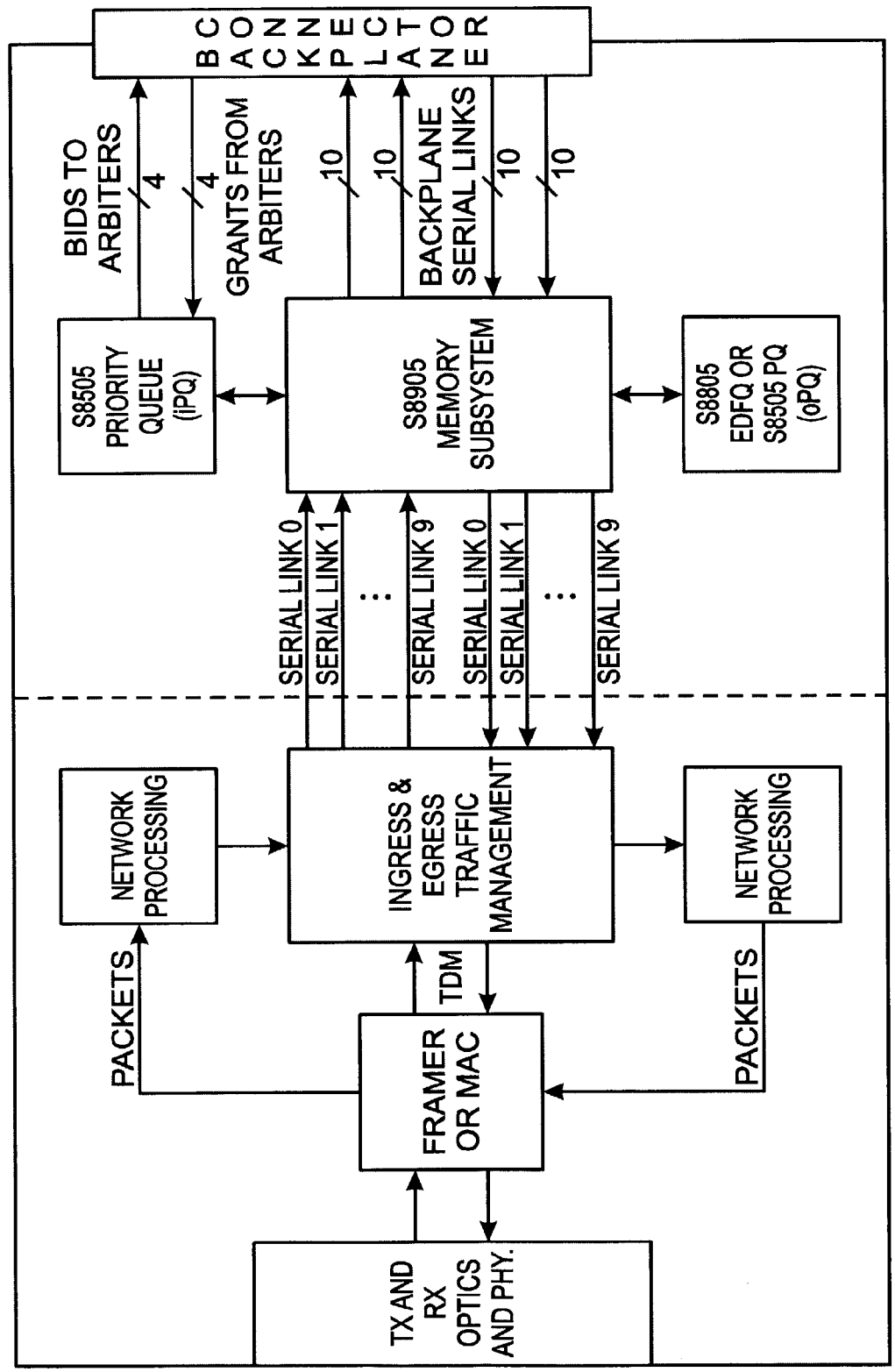
FIG. 4 is a schematic block diagram depicting an example of a single channel port card with all the necessary line functions on a single card.

FIG. 4 is a schematic block diagram depicting an example of a single channel port card with all the necessary line functions on a single card. Packet or best-effort traffic travels through the network processor (NP) and ingress traffic manager (TM) before being sent to the fabric. TDM traffic goes directly from the framer to the TM if it can handle TDM traffic, otherwise it goes to a cellification device, which would then interface to the TDM provisioned links. 10 links are being used on the line ingress and line egress sides of the Memory Subsystem (MS). Having 10 links implies the use of 80-byte Cyclone cells; only 8 links can be used when using a 64-byte cell size. The system description of FIGS. 1 through 12, above, is based upon the use of a 64-byte cell. However, as presented below, the same system elements and processes are used for managing 80-byte cells. The 8 and 10 links represent the maximum number of links that can be used for their respective cell sizes. There is nothing preventing the use of fewer links if they are all that is needed.

The ratio between the number of line ingress links and the number of links carrying data to the backplane gives the backplane speedup for the system. In this example, there are 10 ingress links into the MS and 20 links (2 backplane channels) carrying that data to the backplane. This gives a backplane speedup of 2×. As another example, with 8 ingress links and 12 backplane links, there is a speedup of 1.5×. It should be noted that in addition to the backplane speedup, there is also an ingress/egress speedup. With 10 ingress links capable of carrying 2 Gbps each of raw data, this presents a 20 Gbps interface to the MS. An OC-192 only has approximately 10 Gbps worth of data. Taking into account cell overhead and cell quantization inefficiencies, there still remains excess capacity in the links.

The S8505 iPQ shown in FIG. 4 has all 4 bid and grant links shown. In a 32×32 system with all the cards being single channel cards (320 Gbps), only 4 of the links would need to be used, as described in detail below.

Figure 5:
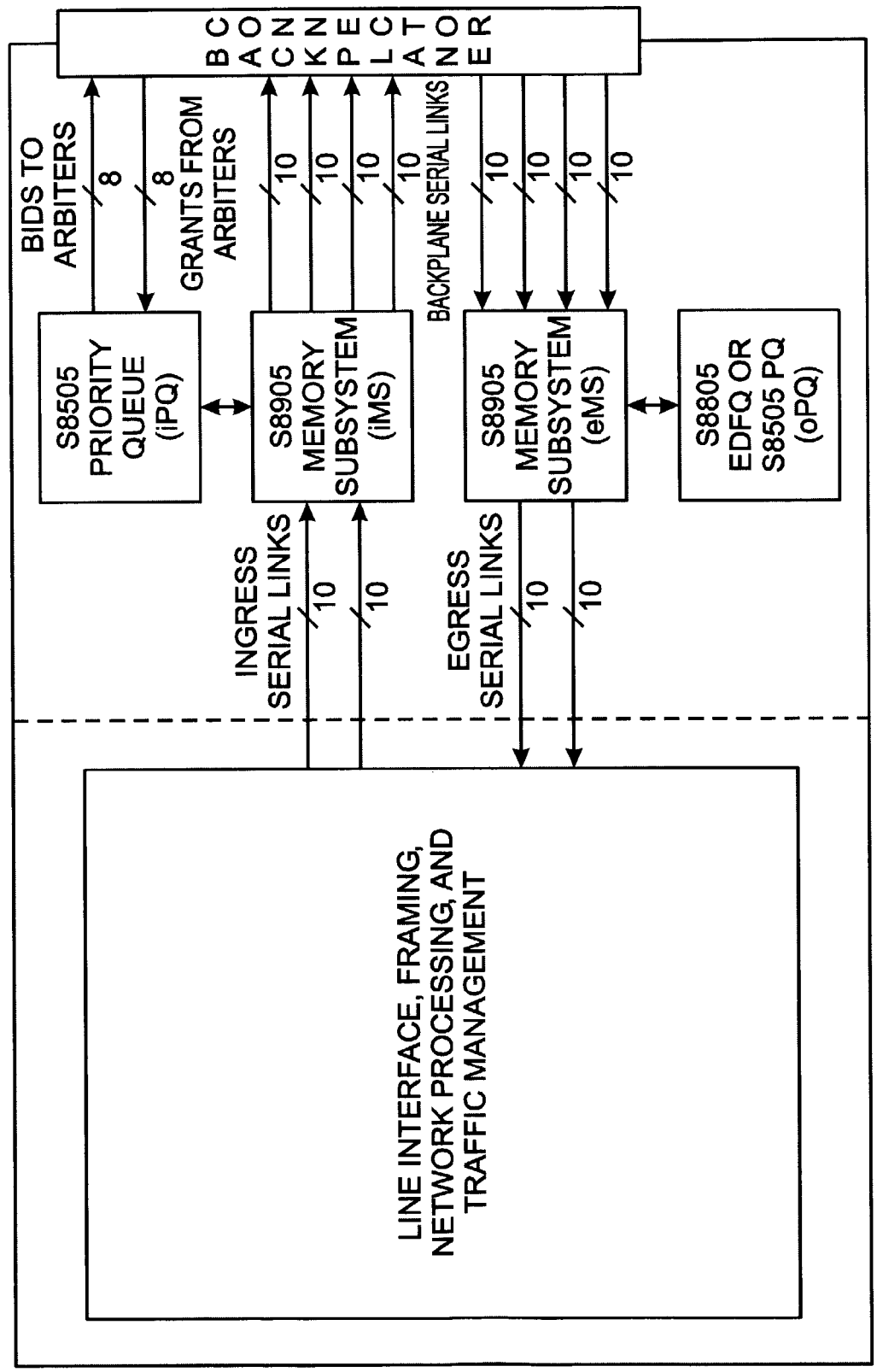
FIG. 5 is a schematic block diagram exemplifying a 2-channel port card.

FIG. 5 is a schematic block diagram exemplifying a 2-channel port card. The only difference between the previous example and this one is the addition of an extra MS. In the single-channel case, one MS takes care of both ingress and egress buffering. In the two-channel case, an additional MS is required in order to provide the number of serial links necessary to function and still have a speedup. Note that the single-channel card can be used as a two-channel card by enabling 10 more ingress and egress links, but there would be no backplane links left to create a speedup.

Just as in the single-channel case, the number of usable links is related to the cell size, and the number used can always be less than the total allowed for that cell size. If the two-channel card of FIG. 5 were used in a 32×32 system (640 Gbps) where all the cards were the same, then all eight links on the PQ would be required for bids and grants. If a 16×16 system of these cards (320 Gbps) were created, then only 4 of the PQ links would be necessary.

Figure 6:
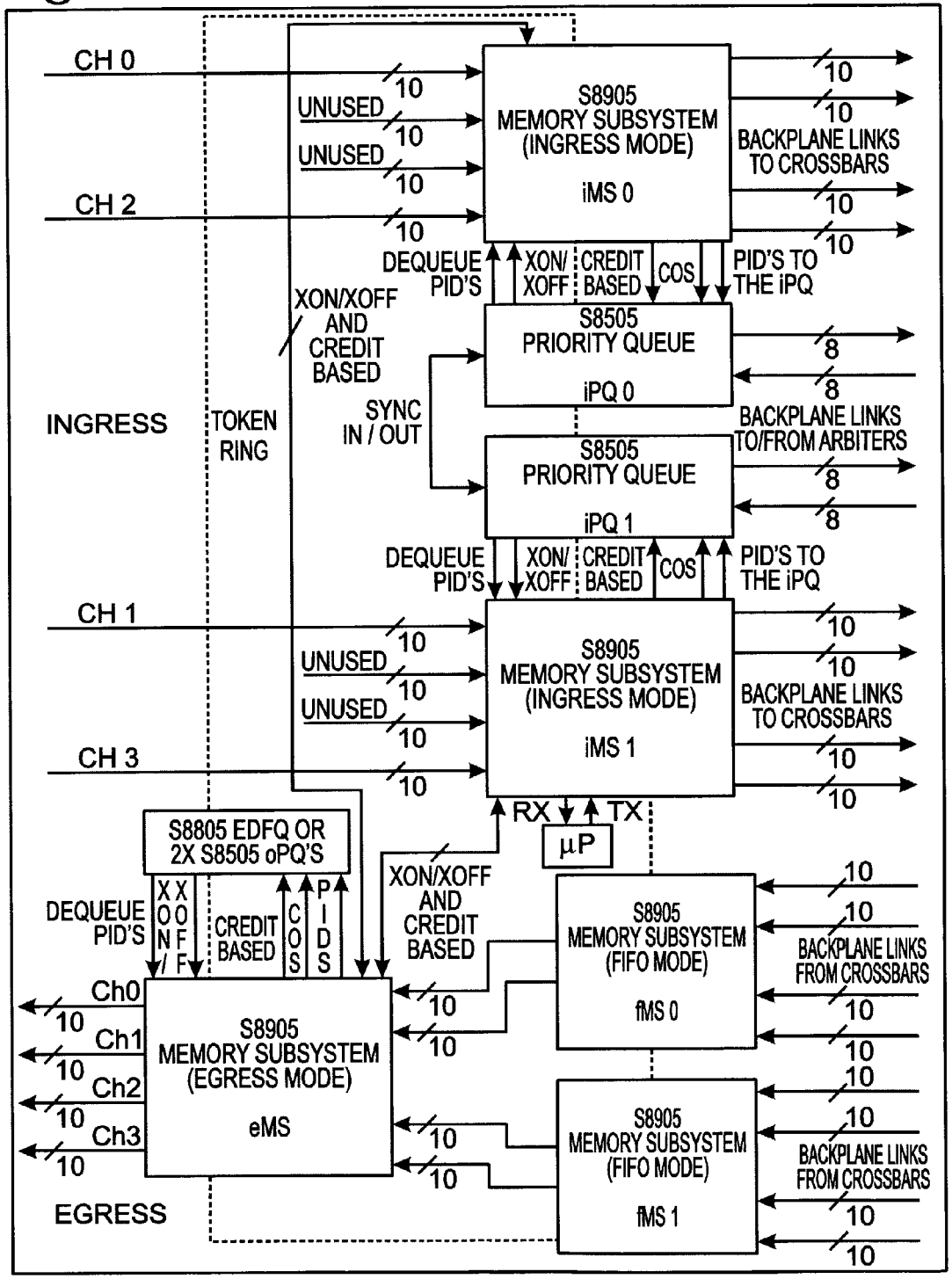
FIG. 6 is a schematic block diagram depicting an example architecture of a 4 channel (OC-768) port card.

FIG. 6 is a schematic block diagram depicting an example architecture of a 4-channel (OC-768) port card. The configuration shown is different than the previous ones shown (FIGS. 4 and 5) in terms of chip counts and functional partitioning. To begin with, instead of having the line interfaces, framers, network processors, and traffic management on the port card, there is a connector. The connector is used because of size constraints, or to customize the system. For instance, it may be desirable to have one channel be fibre channel, the second be 10 Gb Ethernet, the third SONET, and the fourth MPLS.

The number of chips required to support 4 channels is also larger. As shown in the two-channel port card (FIG. 5), it requires an entire MS to support two ingress channels and still have backplane speedup, so in the 4-channel case it is logical that another MS and PQ would be required. It should be noted that the odd ingress channels are defined on one MS and the even channels on the other. This is done for memory access reasons and also has to do with how links are serviced. The first link that is serviced is in channel 0, 8 ns later a link in channel 1 is serviced, 8 ns after that a link in channel 2 is serviced, followed by a link in channel 3, 8 ns later. Then, 8 ns later the next link in line from channel 0 is serviced (32 ns after the previous link from channel 0 was serviced). This process continues, and does not return to the starting link in channel 0 until all the links have been serviced.

Similar to the previously described port cards, the maximum number of links per channel is set according to the cell size, but fewer links can always be used. The number of links used by each channel does not have to be symmetric. This may be desirable in order to decrease the number of traces, but the time slots allocated to pass data through those links will still be reserved. Since there are now two PQs in the system, there are a total of 16 links that can be used for bids and grants. In a 32×32 system where all the cards are 4 channels (1.28 Tbps), all 16 links would be necessary. In a 16×16 4-channel system (640 Gbps), only half as many would be required, 4 per PQ.

The egress side of the 4-channel port card has 3 MSs. A 2× backplane speedup with 4 channels requires 80 links entering the egress side. To terminate 80 links requires 2 MSs, since each MS has 40 links. These two MSs (fMSs) send the traffic to the third MS (eMS) in FIFO order. Scheduling cannot be performed at this point since the scheduler has to be aware of the packets in both MSs. For this reason, and to provide channel multicast, all the traffic must be funneled into a single MS. This removes the backplane speedup and presents a standard 4-channel interface to the egress traffic manager.

Figure 7:
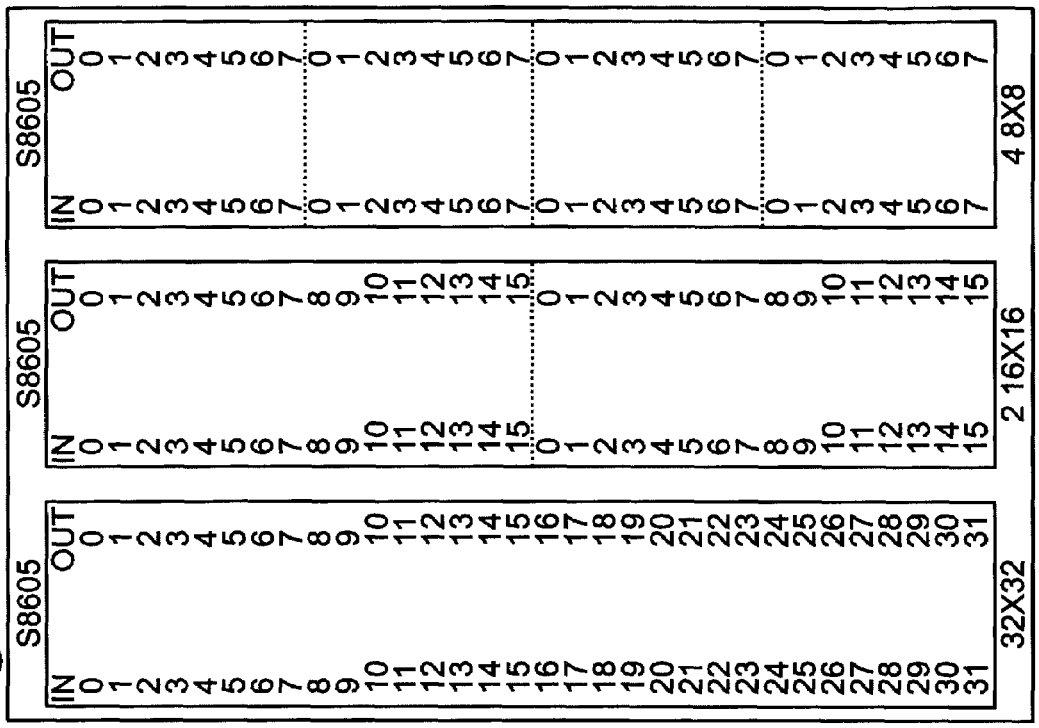
FIG. 7 is a schematic block diagram depicting a switch card.

FIG. 7 is a schematic block diagram depicting a switch card. Switch cards are responsible for connecting the different port cards together to deliver traffic from ingress to egress. The arbiter on the switch card performs a maximal matching algorithm that establishes as many backplane connections as possible to maintain the highest throughput. Each switch card acts independently to service the links attached to it.

A switch card typically has a single arbiter and a number of crossbars. An arbiter can control a maximum of five crossbars. Through the arbiter, a microprocessor can access the crossbar and arbiter registers as well as all the Cyclone chips on all the port cards.

Figure 8:
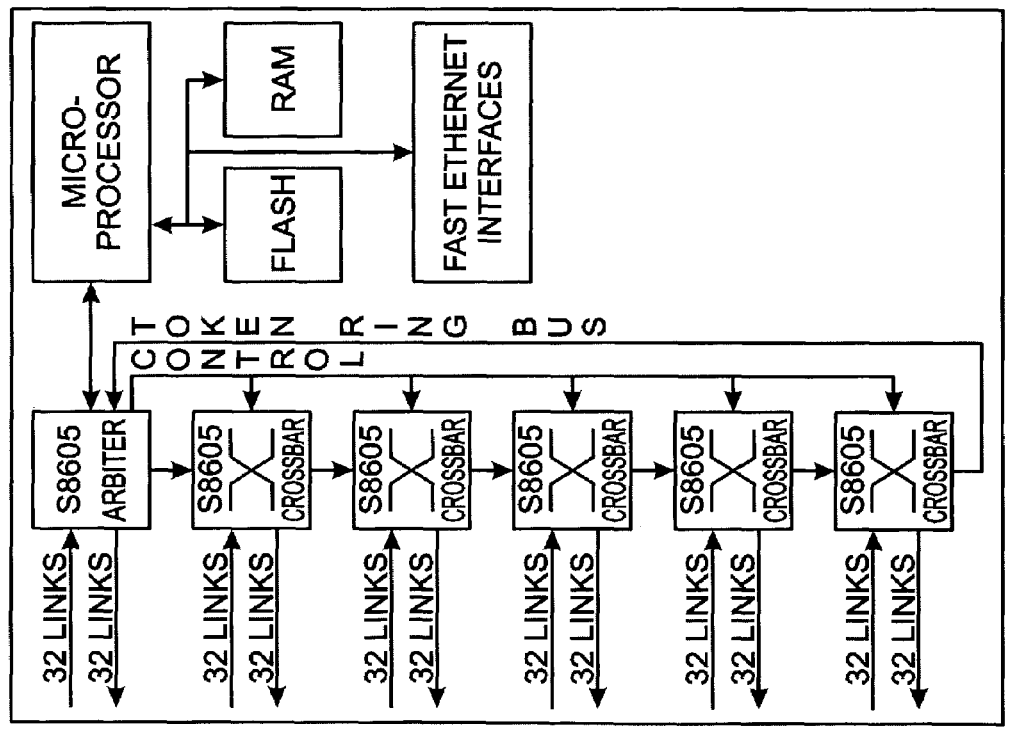
FIG. 8 is diagram illustrating different crossbar configurations.

FIG. 8 is diagram illustrating different crossbar configurations. A fully populated 32×32 port card system can include up to 16 switch cards. The number of crossbars required on a switch card is dependent on the number of links being output by a channel on the backplane (or the backplane speedup). For example, if a backplane channel (no relation to input channels) has 10 links, then 10 crossbars would be required to service it. Links attachments to the switch cards are dependent upon the number of port cards in a system and the arbiter configuration. The arbiter can be configured to treat each of the crossbars as 4 8×8 crossbars, 2 16×16 crossbars, or a single 32×32 crossbar as shown in FIG. 8. The arbiter mode, and hence the crossbar treatment, is dependent on the maximum number of port cards in the switch fabric.

The PQ device may include 1024 queues. These queues are grouped together to create up to 8 class of service (COS) queues which when taken together form virtual output queues (VOQs). The number of queues available for creating different COS levels is dependent on the output port granularity and the number of port cards in the system. For example, if the number of port cards in a system is 32, with 4 egress channels per port card, there would be 1024/(4× 32)=8 COS queues available for each VOQ. Taking the same case but using 4 subchannels per channel, there would only be 2 COS queues available for each VOQ. However, if the number of cards were reduced to 16, then there would be 4 COS queues for each VOQ. The equation to calculate how many COS queues are available is summarized as:

Available # of COS queues per $VOQ$=(Total # of queues)/(# of Port Cards×# of Channels×# of Subchannels).

The number of COS's per VOQ can never be greater than eight.

FIG. 9 is a diagram illustrating link to channel assignments. The MS provides the interface between the line side and the fabric. As mentioned previously, the ratio between the number of backplane links used and the number of ingress/egress links used sets the speedup of the fabric. Each MS has 40 input/output data links which can be used. Every 10 links create a channel, whether it is a backplane channel or an ingress/egress channel. There is no logical relationship between backplane and ingress/egress channels. A packet that arrives on one link can, in general, leave on any other link.

The number of links used in a channel is programmable. Unused links are powered down for power savings. The maximum number of links that can be used in a channel is based on the chosen cell size. When 80-byte cells are used, up to 10 links can be used. When 64-byte cells are being used, only up to 8 links can be used. The unused links would be the ones shown below the dashed lines (the 8th and 9th link of each channel) in FIG. 9.

An 8-10 link channel can be used to transport an OC-192 worth of data traffic. A channel can also be treated as a group of OC-48 subchannels. When subchannels are enabled, the link to subchannel mapping would be organized as shown in Table 1. This organization would repeat for all the ingress/ egress channels. The links of a channel are serviced in round robin order starting at link 0. In general, the time between links is 32 ns. Note that a backplane channel, regardless of whether the ingress/egress channels have subchannels enabled, is always treated as a channel sized entity.

TABLE I

MS Link to Subchannel Mapping for Ingress/Egress Channels using Cyclone Native Cell Format

| Physical Link # | Subchannel # | Subchannel Link # |
|---|---|---|
| 0 (10) (20) (30) | Subchannel 0 | 0 |
| 1 (11) (21) (31) | Subchannel 1 | 0 |
| 2 (12) (22) (32) | Subchannel 2 | 0 |
| 3 (13) (23) (33) | Subchannel 3 | 0 |
| 4 (14) (24) (34) | Subchannel 0 | 1 |
| 5 (15) (25) (35) | Subchannel 1 | 1 |
| 6 (16) (26) (36) | Subchannel 2 | 1 |
| 7 (17) (27) (37) | Subchannel 3 | 1 |
| 8 (18) (28) (38) | Subchannel 0 | 2 |
| 9 (19) (29) (39) | Subchannel 1 | 2 |

Since all links must be serviced in one cell time, it is easy to see why more links can be serviced when a longer cell is used. A 64-byte cell takes 256 ns to be received at 2.5 Gbps. (256 ns)/(32 ns/link) gives enough time for 8 links. An 80-byte cell takes 320 ns to be received at 2.5 Gbps. (320 ns)/(32 ns/link) gives enough time for 10 links. For 64-byte cells, links 8 and 9 of each channel shown in Table 1 would not be used.

Table 2 and Table 3 show ViX-v3 cell format mappings, which are for 64-byte cells only. Since ViX-v3 cells are striped across 2 or 8 links, each cell takes 128 ns for the OC-48 cell format or 32 ns for the OC-192 cell format.

TABLE 2

MS Link to Subchannel Mapping for Ingress/Egress Channels using ViX-v3 OC-48 Cell Format

| Physical Link # | Subchannel # | Subchannel Link # |
|---|---|---|
| 0 (10) (20) (30) | Subchannel 0 | 0 |
| 1 (11) (21) (31) | Subchannel 0 | 1 |
| 2 (12) (22) (32) | Subchannel 1 | 0 |
| 3 (13) (23) (33) | Subchannel 1 | 1 |
| 4 (14) (24) (34) | Subchannel 2 | 0 |
| 5 (15) (25) (35) | Subchannel 2 | 1 |
| 6 (16) (26) (36) | Subchannel 3 | 0 |
| 7 (17) (27) (37) | Subchannel 3 | 1 |
| 8 (18) (28) (38) | N/A | N/A |
| 9 (19) (29) (39) | N/A | N/A |

TABLE 3

MS Link to Subchannel Mapping for Ingress/Egress Channels using ViX-v3 OC-192 Cell Format

| Physical Link # | Subchannel # | Subchannel Link # |
|---|---|---|
| 0 (10) (20) (30) | Subchannel 0 | 0 |
| 1 (11) (21) (31) | Subchannel 0 | 1 |
| 2 (12) (22) (32) | Subchannel 0 | 2 |
| 3 (13) (23) (33) | Subchannel 0 | 3 |
| 4 (14) (24) (34) | Subchannel 0 | 4 |
| 5 (15) (25) (35) | Subchannel 0 | 5 |

TABLE 3-continued

MS Link to Subchannel Mapping for Ingress/Egress Channels using ViX-v3 OC-192 Cell Format

| Physical Link # | Subchannel # | Subchannel Link # |
|---|---|---|
| 6 (16) (26) (36) | Subchannel 0 | 6 |
| 7 (17) (27) (37) | Subchannel 0 | 7 |
| 8 (18) (28) (38) | N/A | N/A |
| 9 (19) (29) (39) | N/A | N/A |

Switch Planes

Figure 11:
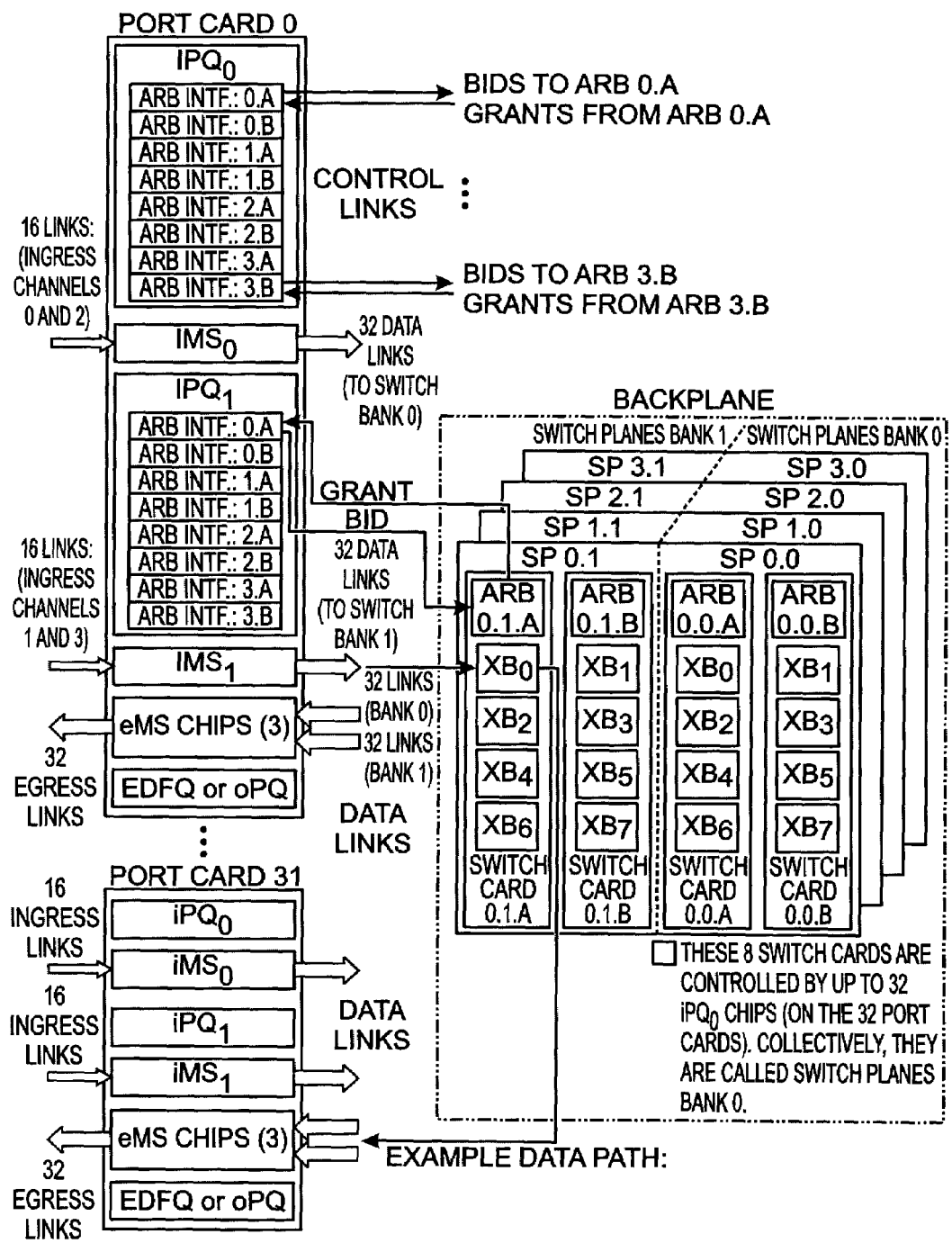
FIG. 11 is a schematic block diagram depicting the switch fabric backplane.

Two switch cards, that together service a backplane channel, form a switch plane. A backplane channel, as defined in the previous subsection, consists of a group of backplane data links from the MS that carry traffic to the same switch plane. The timing of the links in a backplane channel is such that one link is serviced in the channel every 32 ns with all the links in that channel getting serviced in one cell time. In a fully provisioned 32×32 port card system, there would be 32 4-channel port cards and 16 switch cards forming 2 banks of 4 switchplanes as shown in FIG. 11.

The entity that makes two switch cards function together as a switch plane to service a backplane channel is the iPQ. The association between a switchplane and (two) switch cards is determined by the particular association of arbiter and iPQ. The association between switchplane bank and switchplane is determined by the iPQ connected to the switchplane. An iPQ communicates only with the arbiter on a switch card. The arbiter is then responsible for configuring the crossbars.

Figure 10:
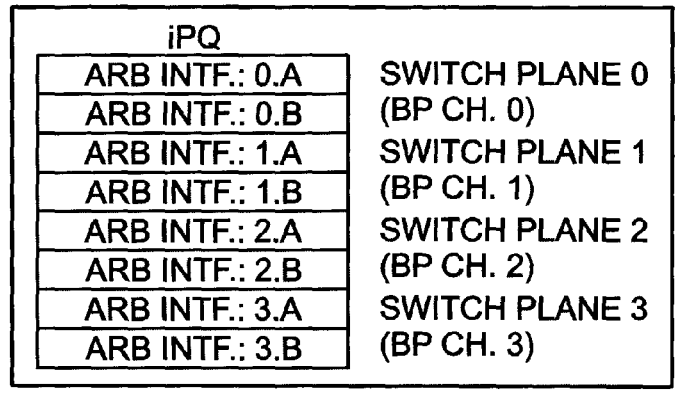
FIG. 10 is a diagram depicting iPQ arbiter interface to switchplane and backplane channel mapping.
Figure 18:
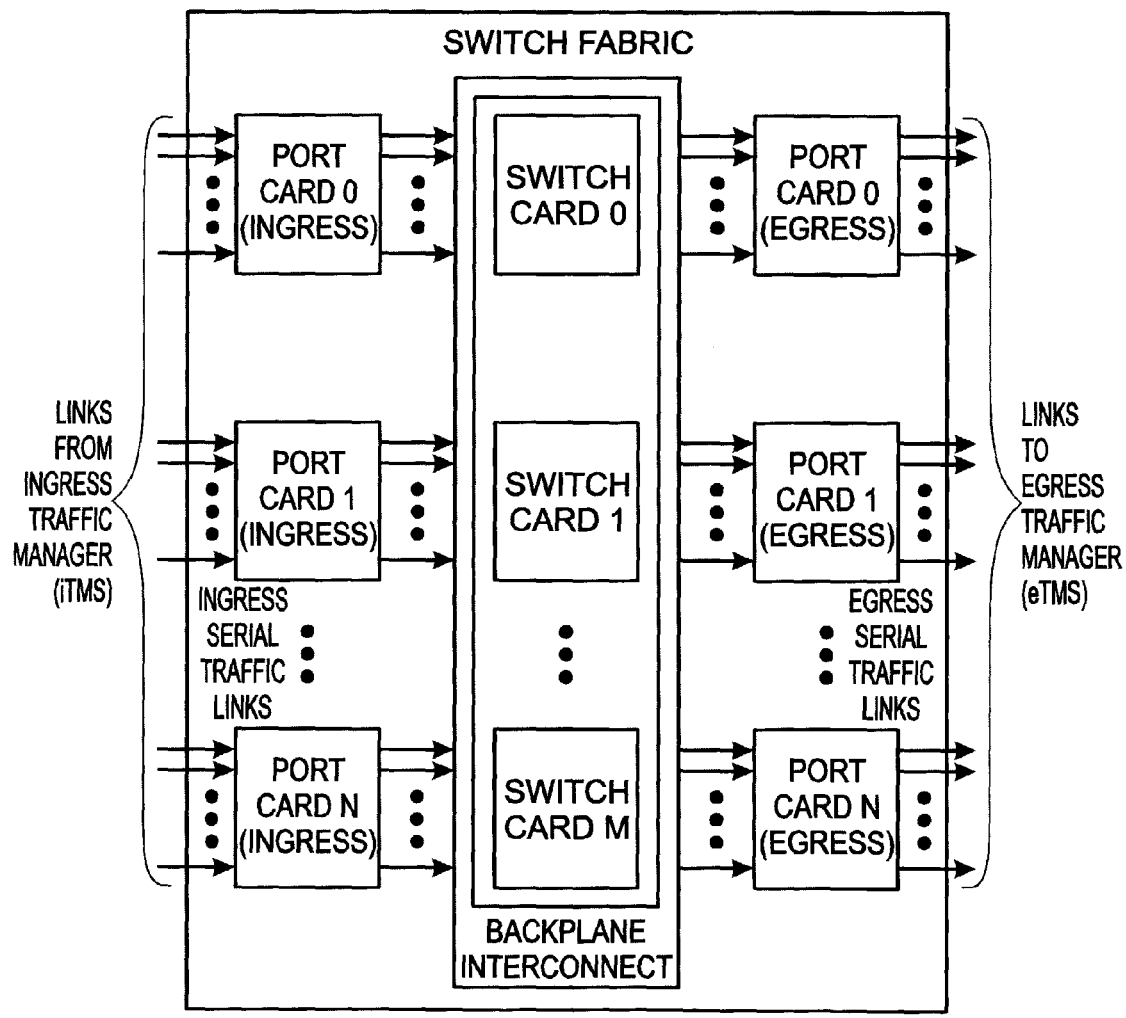
FIG. 18 is a schematic block diagram of a general switch fabric system (prior art).

FIG. 10 is a diagram depicting iPQ arbiter interface to switchplane and backplane channel mapping. The arbiter interfaces on the iPQ directly correspond to the backplane channels of the MS, as shown. In other words, arbiter interfaces 0.A and 0.B handles the bids and grants for backplane channel 0. The two arbiters attached to interfaces 0.A and 0.B form switchplane 0 (as shown in FIG. 20) that controls the crossbars attached to the links of backplane channel 0. An iPQ has 8 arbiter interfaces and can handle the bids and grants to 4 switch planes, thus servicing all the 4 backplane channels possible in an MS. A 4-ingress channel configuration, shown in FIG. 6, requires two iPQs and two MSs to support a 2× speedup (generates 8 backplane channels).

When there are two iPQs, each one controls a "bank" of switchplanes. To uniquely identify switchplanes, the associated backplane channel and switchplane bank must be known. The nomenclature SP X.Y is used where X is the switchplane number (and backplane channel) and Y is the switchplane bank. There are two switchplane banks, banks 0 and 1. Switchplane bank 0 switchplanes are defined as those connected to the iPQ that is servicing packets that came from ingress channels 0 and 2. Switchplane bank 1 switchplanes are defined as those connected to the iPQ servicing ingress channels 1 and 3.

The arbiters in a switchplane are denoted by the switchplane number and by the arbiter interface to which they are attached. An arbiter, and its switch card, is uniquely identified by the nomenclature Arb X.Y.Z, where X is the switchplane number, Y is the switchplane bank, and Z is the arbiter interface (A or B) on the iPQ from which the arbiter is receiving bids. An arbiter attached to an A interface handles bids and grants for even numbered links. The arbiter attached to the B interface handles the bids and grants for the odd numbered links of its backplane channel.

FIG. 11 is a schematic block diagram depicting the switch fabric backplane. The crossbars on the A cards are even numbered and those on the B cards are odd numbered. A specific crossbar ALWAYS handles the SAME numbered link from each of the port cards. For instance, all the link 0's of a specific backplane channel from all the port cards will be attached to the same crossbar, with the position on the crossbar set by which card in the system the link is coming from. In a 32-port system, this will entirely fill the crossbar with link 0's. The link 1's would then go to the first crossbar on the B card of the switchplane. The link 2's would go on the second crossbar of the A card. This relationship continues until all the crossbars in the switchplane are filled. Examples of the connectivity are provided below in a later section.

Speedup

Speedup has already been mentioned in terms of the number of links entering the MS, as compared to the number of links leaving the MS. That calculation results in the backplane speedup. There is also a speedup associated with getting into and out of an ingress or egress channel, respectively. This speedup is defined as the channel speedup. The channel speedup is dependent on the raw amount of traffic, the cell size, cellification efficiency, the number of links, and the link speed with the 8B/10B coding removed. Following are some examples that show the actual available link bandwidths using an 80% cellification efficiency:

64-byte unicast cell with 8 overhead bytes: The total available bandwidth for payload would then be 2 Gbps×56/64=1.75 Gbps. Given a cellification efficiency of 80%, there would then be 1.4 Gbps used for payload per link;

64-byte multicast cell with 11 overhead bytes: available payload bandwidth=2 Gbps×53/64=1.656 Gbps. With a cellification efficiency of 80%, there would then be 1.325 Gbps used for payload per link;

80-byte unicast cell with 8 overhead bytes: available payload bandwidth=2 Gbps×72/80=1.8 Gbps. With a cellification efficiency of 80%, there would then be 1.44 Gbps used for payload per link; and, 80-byte multicast cell with 11 overhead bytes: available payload bandwidth=2 Gbps×69/80=1.725 Gbps. With a cellification efficiency of 80%, there would then be 1.38 Gbps used for payload per link.

Using the first example, assuming an OC-192 (9.95328 Gbps) of raw data bandwidth, and 8 ingress links per channel, the channel speedup would be (8×1.4)/9.95328=1.125. The total system speedup, if the backplane speedup were 2, would be 1.125×2=2.25.

Active Redundancy

When cards in a switch plane fail or are removed, the iPQs automatically distribute the traffic across the remaining switchplanes. Since there is a speedup across the backplane, the loss or removal of a card would cause a decrease in the amount of switching resources but would not cause any traffic to stop being switched. In the case of a link failure, the crossbar informs its arbiter, and the arbiter ceases to grant connections for that link.

Configurations

The switch fabric can be optimized for three different port card counts. These optimizations result in reduced chip count and hence less system power. The fabric can be optimized for 8×8, 16×16, or 32×32 port card switching.

Number of Arbiters and Crossbars Required

The number of arbiters required in a system is dependent on the number of ingress/egress and backplane channels. Two arbiters are required to service a backplane channel when redundancy is required such that the following general relationship applies:

# of Arbiters=(# ingress channels×speedup×2 Arbiters per backplane channel)/divisor.

Values of less than 2 are rounded up to 2. In most systems, the minimum number of arbiters is 2. The speedup is either 1 or 2. If the actual speedup is greater than 1, then 2 should be used in the equation. For an 8×8 configuration, the divisor would be 4. For 16×16, the divisor is 2. For 32×32, the divisor would be 1.

The number of crossbars that are required in a system is dependent on how many links are being used to create the backplane channels. There should be an even number of crossbars and they would be divided evenly across the switch cards. The following equation, for most cases, provides the correct number of crossbars:

# of Crossbars=(# links per ingress channel×# of ingress channels per port×# of port cards× speedup)/32.

For the 8×8 configuration, the # of crossbars should be multiplied by (4×# of iMS)/(# backplane channels per port card). The number of port cards should be rounded up to the nearest supported configuration, i.e. 8, 16, or 32. The speedup in the case of crossbars should be the fractional speedup that is desired.

Example to determine the number of arbiters and crossbars for the following system:

4 channel port cards (40 Gbps)
8 links per channel
16 port cards
Speedup=1.5
# of arbiters=(4×2×2)/2=8
# of crossbars=(8×4×16×1.5)/32=24. This would give 3 crossbars per arbiter.

32×32 Configuration

The 32×32 configuration is used for all cases where expansion to 32 port cards is desired, or where the number of port cards is greater than 16. All configurations, including the 32×32, can be used with single channel, 2-channel, or 4-channel port cards. The 32×32 case is the simplest of cases to conceptually understand the wiring and is hence presented first.

Figure 12:
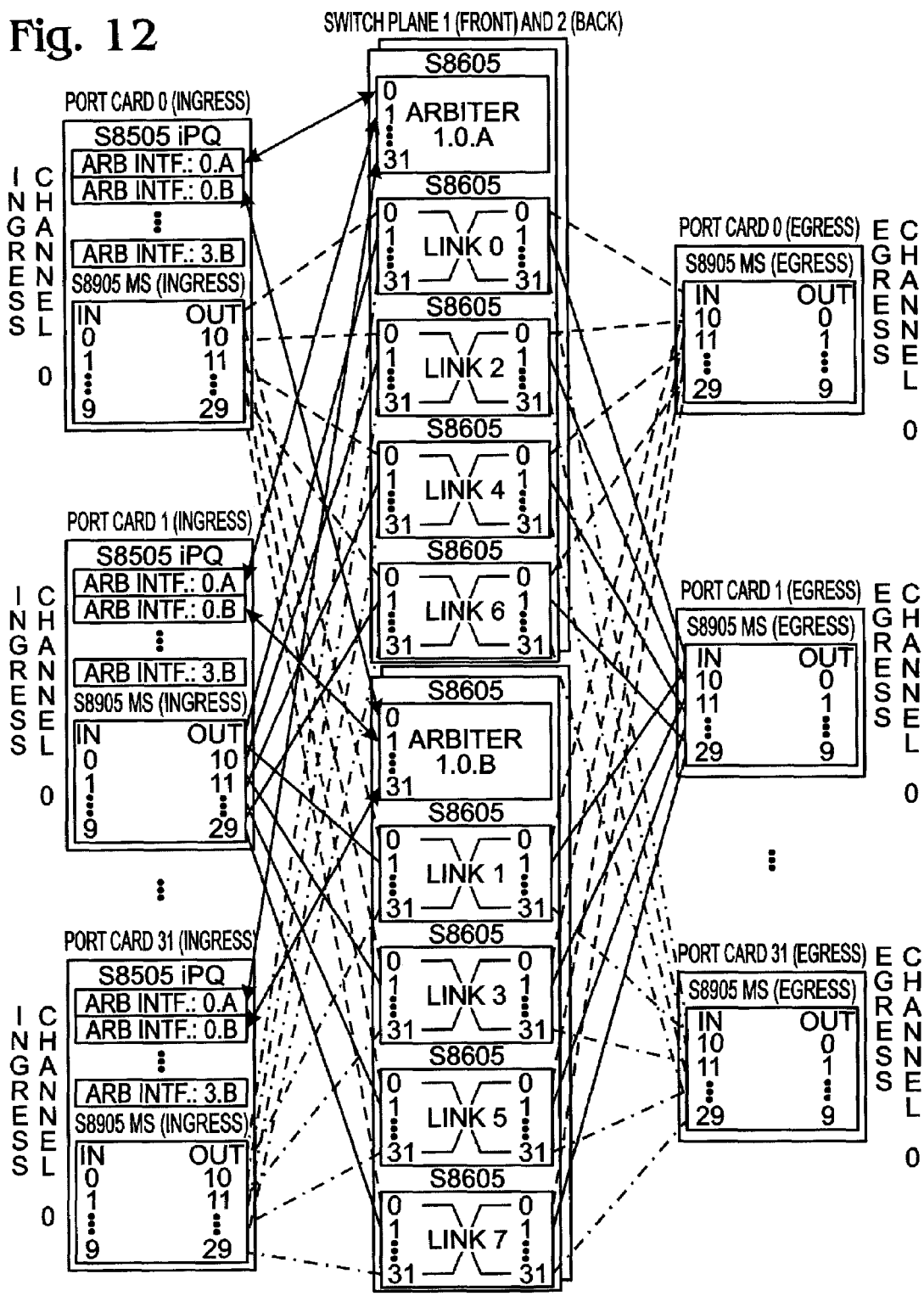
FIG. 12 is a schematic block diagram illustrating a 32×32 single channel system, using 8 links per channel, with a 2× backplane speedup.

FIG. 12 is a schematic block diagram illustrating a 32×32 single channel system, using 8 links per channel, with a 2× backplane speedup. This system is also optimized to use one MS for ingress and egress on each port card. The simplest correlation of backplane channels 1 and 2 on the port cards is with switch planes 1 and 2. In the figure, only the connectivity for switchplane 1 is drawn for clarity. Switchplane 2 is shown behind switchplane 1 and would be wired identically except that switchplane 2 would be connected to the PQs' arbiter 2 interface and a different backplane channel. Points to note in FIG. 12 are the following:

In the single channel configuration, the egress MS is the same device as the ingress MS. Ingress and egress links 30-39 on the MS would not be used and would be powered off. Arbiter interfaces 0.A, 0.B, 3.A and 3.B are unused and would be powered off. MS links 0-7 are used for both the ingress and egress to the traffic manager. Backplane channels 1 and 2 are used for the backplane connectivity. Each crossbar always handles the same numbered link from each port card. Link numbers on the crossbars correspond to the port card numbers. Link numbers on the MSs to the backplane, modulo 10, correspond to the backplane channel's link number. If it were desired to run 10-links per channel, a 5th crossbar would be added to each switch card.

To expand the system beyond a single ingress channel, thus adding more backplane channels, would require adding more switchplanes, with one switchplane per backplane channel.

In general, there should always be symmetry between the ingress and egress side of a port card, and the input and output sides of the backplane. When using multiple MSs, as in the 2- and 4-channel cases, the same symmetry would be maintained as in the single-channel case. Backplane channels would match up with each other as well as the link numbers the ingress and egress channels are using.

16×16 Configuration

The 16×16 configuration takes advantage of the fact that a 32×32 crossbar and arbiter can be treated as two 16×16 crossbars and arbiters. By doing this, the number of switchplanes, and hence arbiters and crossbars, required is reduced by half.

Figure 13:
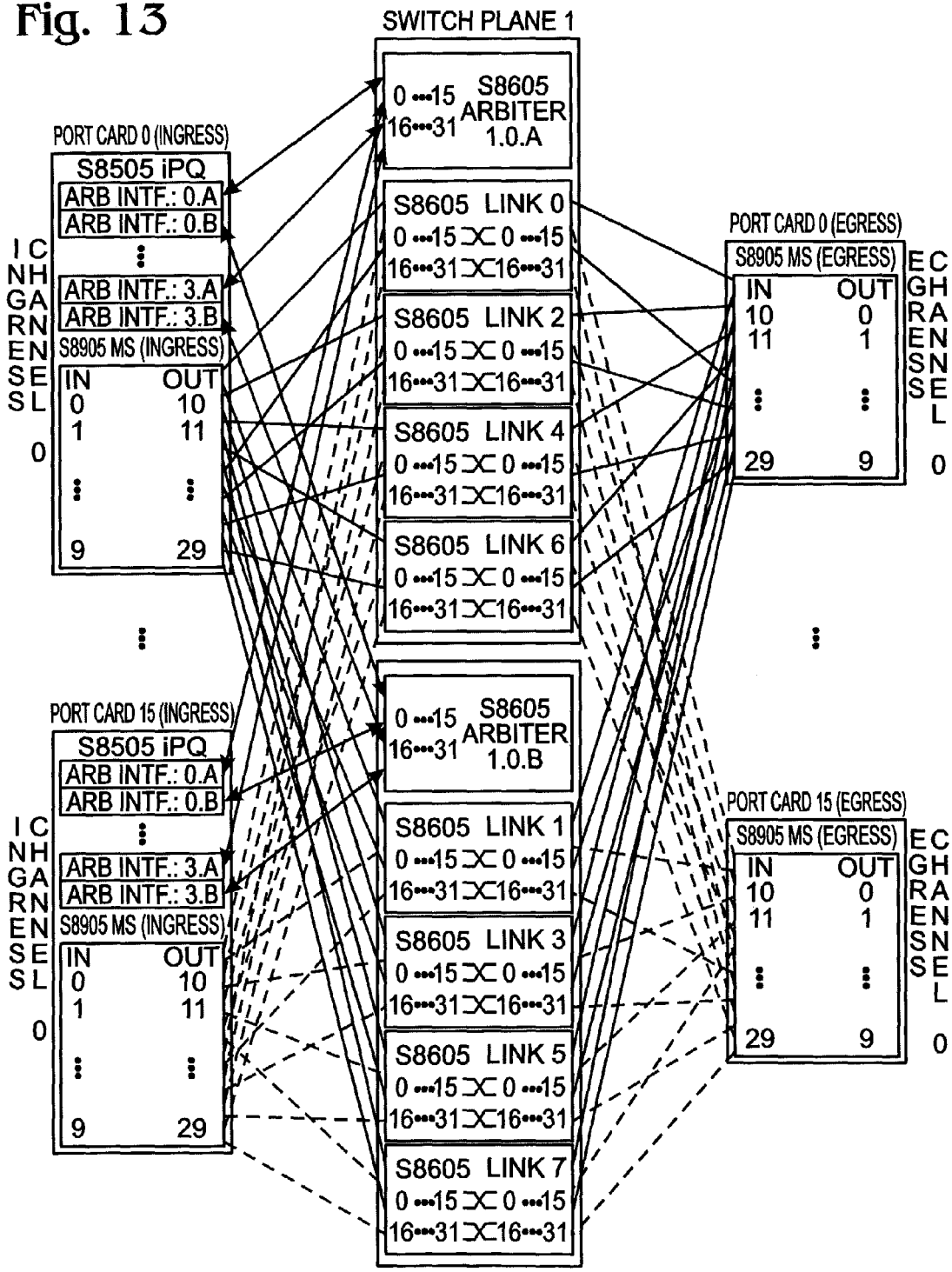
FIG. 13 is a schematic block diagram depicting a 16×16 channel system with 2× speedup.

FIG. 13 is a schematic block diagram depicting a 16×16 channel system with 2× speedup. 8 links per channel are used with non-aggregated bids. Points to note in FIG. 13 are the following:

In the single channel configuration, the egress MS is the same as the ingress MS. As far as the port card is concerned, the only difference between 16×16 and 32×32 is the organization of the switchplane. The port card remains the same. Backplane channels 1 and 2 are used for the backplane connectivity. Ingress and egress links 30-39 on the MS would not be used and would be powered off. Arbiter interfaces 0.A, 0.B, 3.A and 3.B on the PQ are unused and would be powered off. MS links 0-7 are used for both the ingress and egress to the traffic manager. Each crossbar always handles the same numbered link within a backplane channel from each port card. Link numbers on the crossbars, modulo 16, correspond to the port card numbers. Link numbers on the MSs to the backplane, modulo 10, correspond to the backplane channel's link number. If it were desired to run 10-links per channel, a 5th crossbar would be added to each switch card.

To expand to more than a single channel, the two-channel or four-channel port card would be used. The backplane connectivity would essentially remain the same except for the addition of more switch planes to handle the increase in backplane channels.

Figure 14:
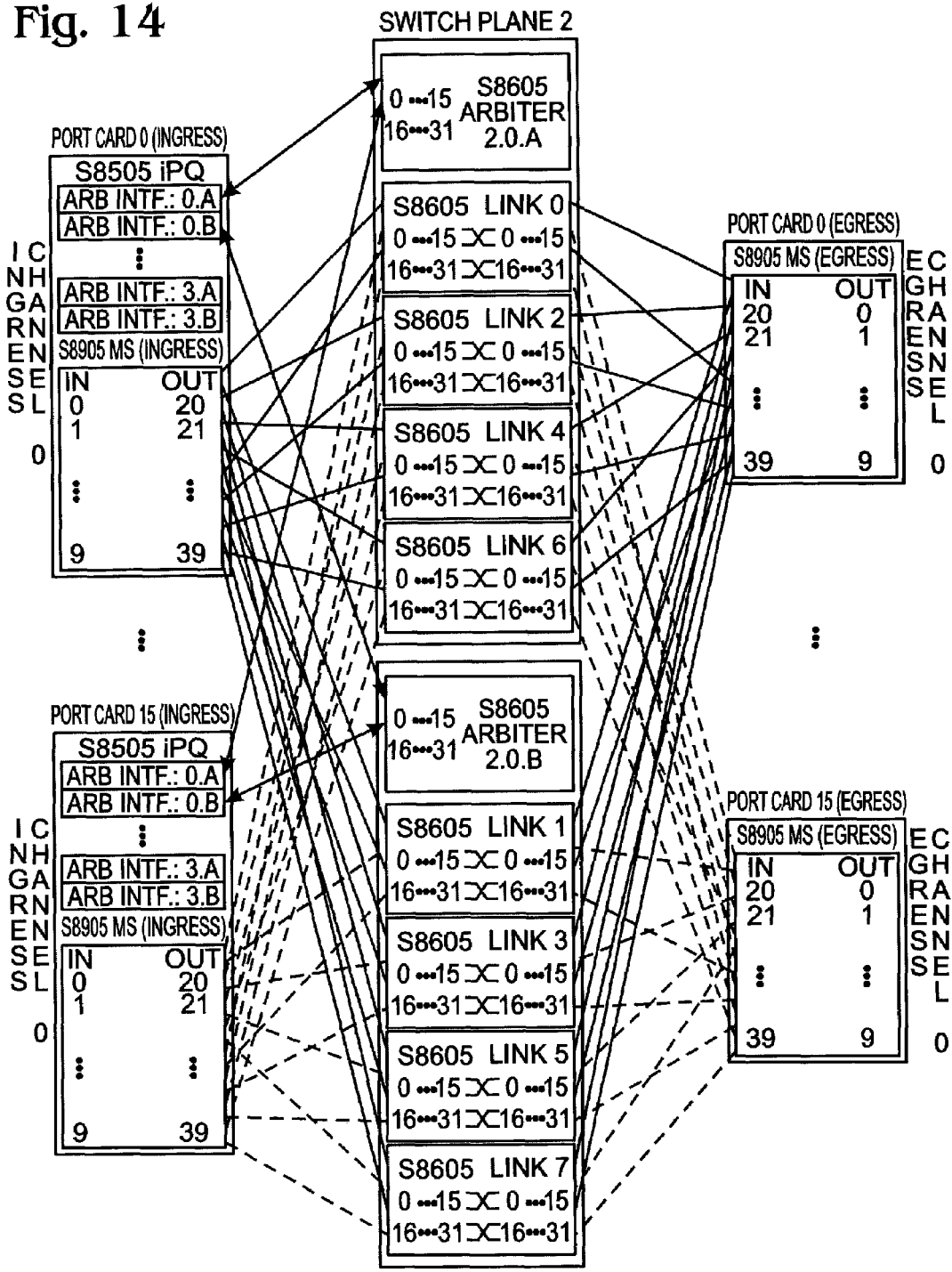
FIG. 14 is a schematic block diagram illustrating the connectivity of a 16×16 single channel system, with a 2× backplane speedup, using 8 links per channel and aggregated bids.

FIG. 14 is a schematic block diagram illustrating the connectivity of a 16×16 single channel system, with a 2× backplane speedup, using 8 links per channel and aggregated bids. The advantage of aggregating bids and grants is that the number of PQ to arbiter connections is reduced from 4 to 2 per port card. Points to note in FIG. 14 are the following:

In the single channel configuration, the egress MS is the same as the ingress MS. Since aggregation at the PQ for 2 backplane channels group [0, 1] together and [2, 3] together, bids and grants come through 2A and 2B. Backplane channels 2 and 3 are used for the backplane connectivity. Ingress and egress links 10-19 on the MS would not be used and would be powered off. Links 16-31 on the arbiters would not be used and would be powered off. Arbiter interfaces 0.A, 0.B, 1.A, 1.B, 3.A and 3.B on the PQ are unused and would be powered off. MS links 0-7 are used for both the ingress and egress to the traffic manager. Each crossbar always handles the same numbered link within a backplane channel from each port card. Link numbers on the crossbars, modulo 16, correspond to the port card numbers. Link numbers on the MSs to the backplane, modulo 10, correspond to the backplane channel's link number. If it were desired to run 10-links per channel, a 5th crossbar would be added to each switch card.

To expand to more than a single channel, the two-channel or four-channel port card would be used. The backplane connectivity would essentially remain the same except for the addition of more switch planes to handle the increase in backplane channels.

8×8 Configuration

The 8×8 configuration takes advantage of the fact that each arbiter and crossbar can be treated as four 8×8 arbiters and crossbars. In a system with 8 port cards or less, this means that there would be ¼ of the switching resources required to build the same system using the 32×32 configuration, or ½ of the switching resources to build the same system using the 16×16 configuration. If more than 8, but less than 17 port cards are required, then the 16×16 configuration would have to be used.

Figure 15:
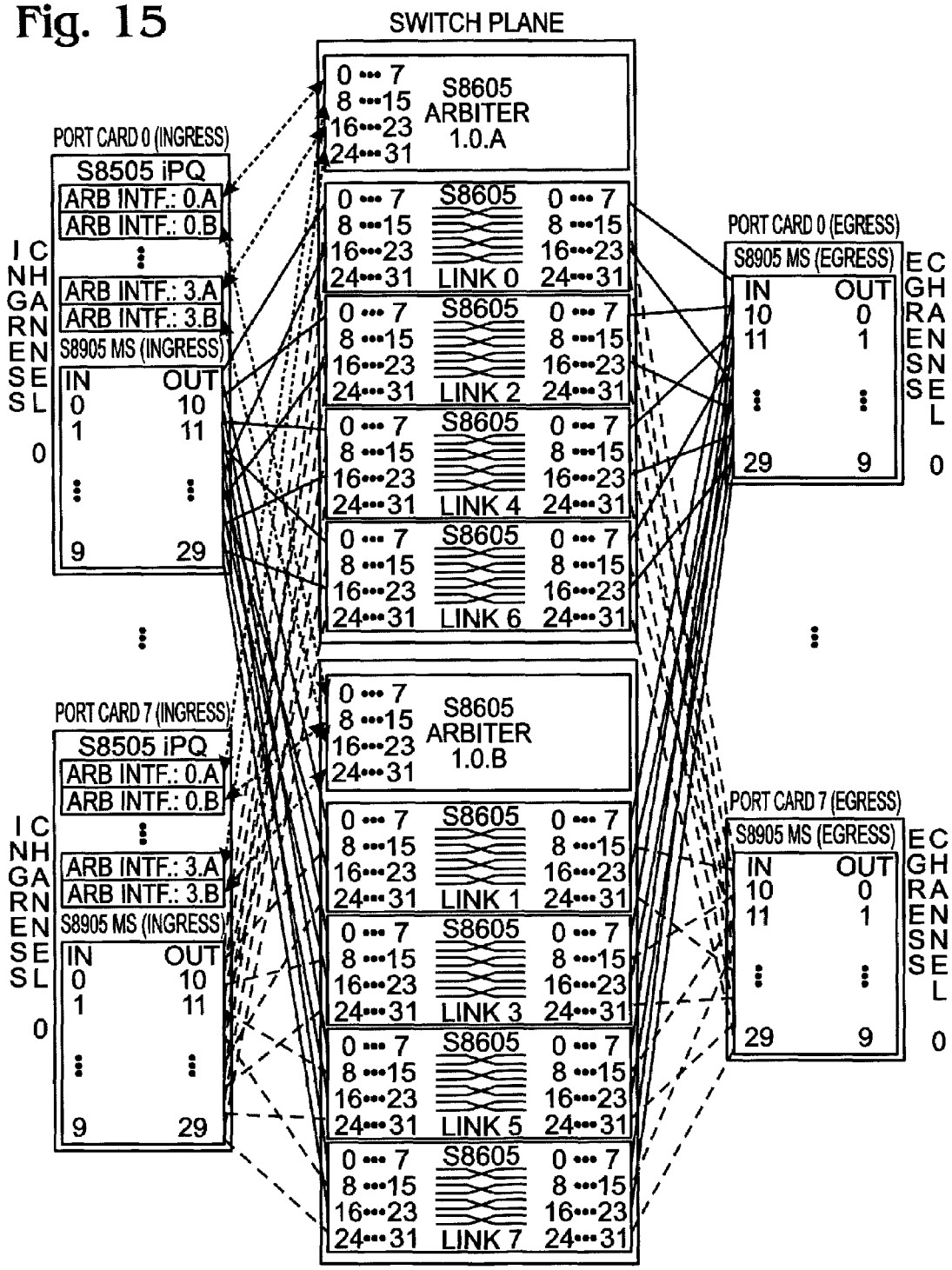
FIG. 15 is a schematic block diagram illustrating the connectivity for an 8×8 single channel system, with a 2× backplane speedup, using 8 links per channel and non-aggregated bids.

FIG. 15 is a schematic block diagram illustrating the connectivity for an 8×8 single channel system, with a 2× backplane speedup, using 8 links per channel and non-aggregated bids. Links 0-7 and 24-31 on the arbiter are not used. Bids and grants for the 4 sections of each crossbar are handled by the same arbiter. The points to note about the 8×8 configuration shown in FIG. 15 are the following:

In the single channel configuration, the egress MS is the same as the ingress MS. As far as the port card is concerned, the only difference between 8×8 and 16×16 is the organization of the switchplane. The port card remains the same. Ingress and egress links 30-39 on the MS would not be used and would be powered off. Links 0-7 and 24-31 on the arbiters would not be used and would be powered off. Links 0-7 and 24-31 on the crossbars would not be used and would be powered off. Arbiter interfaces 0.A, 0.B, 3.A and 3.B on the PQ are unused and would be powered off. MS links 0-7 are used for both the ingress and egress to the traffic manager. Backplane channels 1 and 2 are used for the backplane connectivity. Each crossbar always handles the same numbered link within a backplane channel from each port card. Link numbers on the crossbars, modulo 8, correspond to the port card numbers. Link numbers on the MSs to the backplane, modulo 10, correspond to the backplane channel's link number. If it were desired to run 10-links per channel, a 5th crossbar would be added to each switch card.

If the port cards in FIG. 15 were upgraded to 2-channel port cards, no additional switching resources would be required. Links 0-7 and 24-31 of each of the crossbars would be wired to handle the extra two backplane channels. To modify the system to handle 4-channel port cards would simply require the addition of a switch plane.

Figure 16:
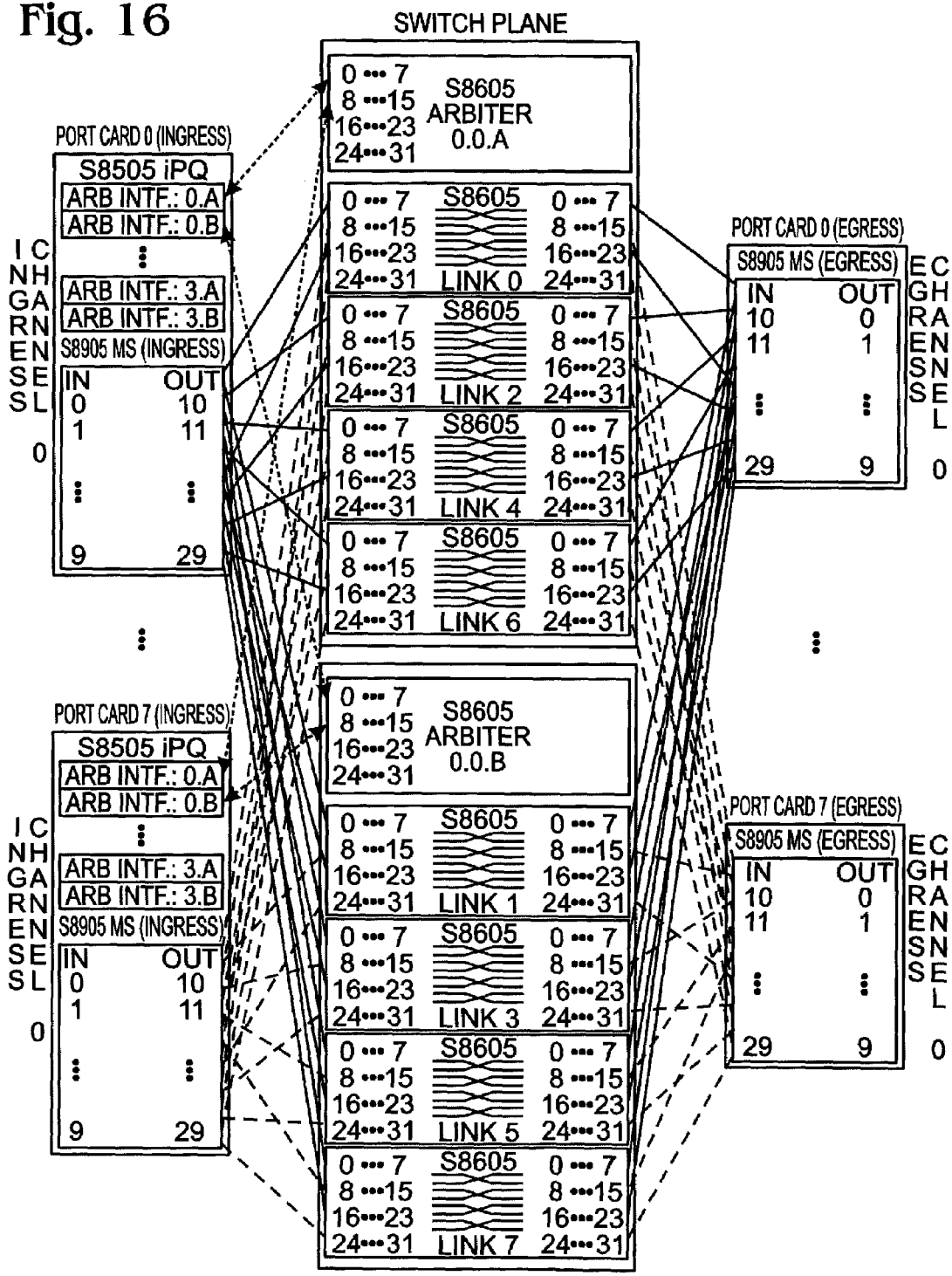
FIG. 16 is a schematic block diagram depicting the connectivity for an 8×8 single channel system, with a 2× backplane speedup, using 8 links per channel and aggregated bids.

FIG. 16 is a schematic block diagram depicting the connectivity for an 8×8 single channel system, with a 2× backplane speedup, using 8 links per channel and aggregated bids. Links 8-31 on the arbiter are not used in 8×8 mode, since the bids and grants for the 4 sections of each crossbar are aggregated and handled by the same arbiter interface. Bids and grants for unused crossbar sections will be nulled out at the PQ. The points to note about the 8×8 configuration shown in FIG. 16 are the following:

In the single channel configuration, the egress MS is the same as the ingress MS. As far as the port card is concerned, the only difference between 8×8 and 16×16 is the organization of the switchplane. The port card always remains the same. Ingress and egress links 30-39 on the MS would not be used and would be powered off. Links 8-31 on the arbiters would not be used and would be powered off. Links 0-7 and 24-31 on the crossbars would not be used and would be powered off. Arbiter interfaces 1.A through 3.B on the PQ are unused and would be powered off. MS links 0-7 are used for both the ingress and egress to the traffic manager. Backplane channels 1 and 2 are used for the backplane connectivity. Each crossbar always handles the same numbered link within a backplane channel from each port card. Link numbers on the crossbars, modulo 8, correspond to the port card numbers. Link numbers on the MSs to the backplane, modulo 10, correspond to the backplane channel's link number. If it were desired to run 10-links per channel, a 5th crossbar would be added to each switch card.

If the port cards in FIG. 16 were upgraded to 2-channel port cards, no additional switching resources would be required. Links 0-7 and 24-31 of each of the crossbars would be wired to handle the extra two backplane channels. To modify the system to handle 4-channel port cards would simply require the addition of a switch plane.

Figure 17:
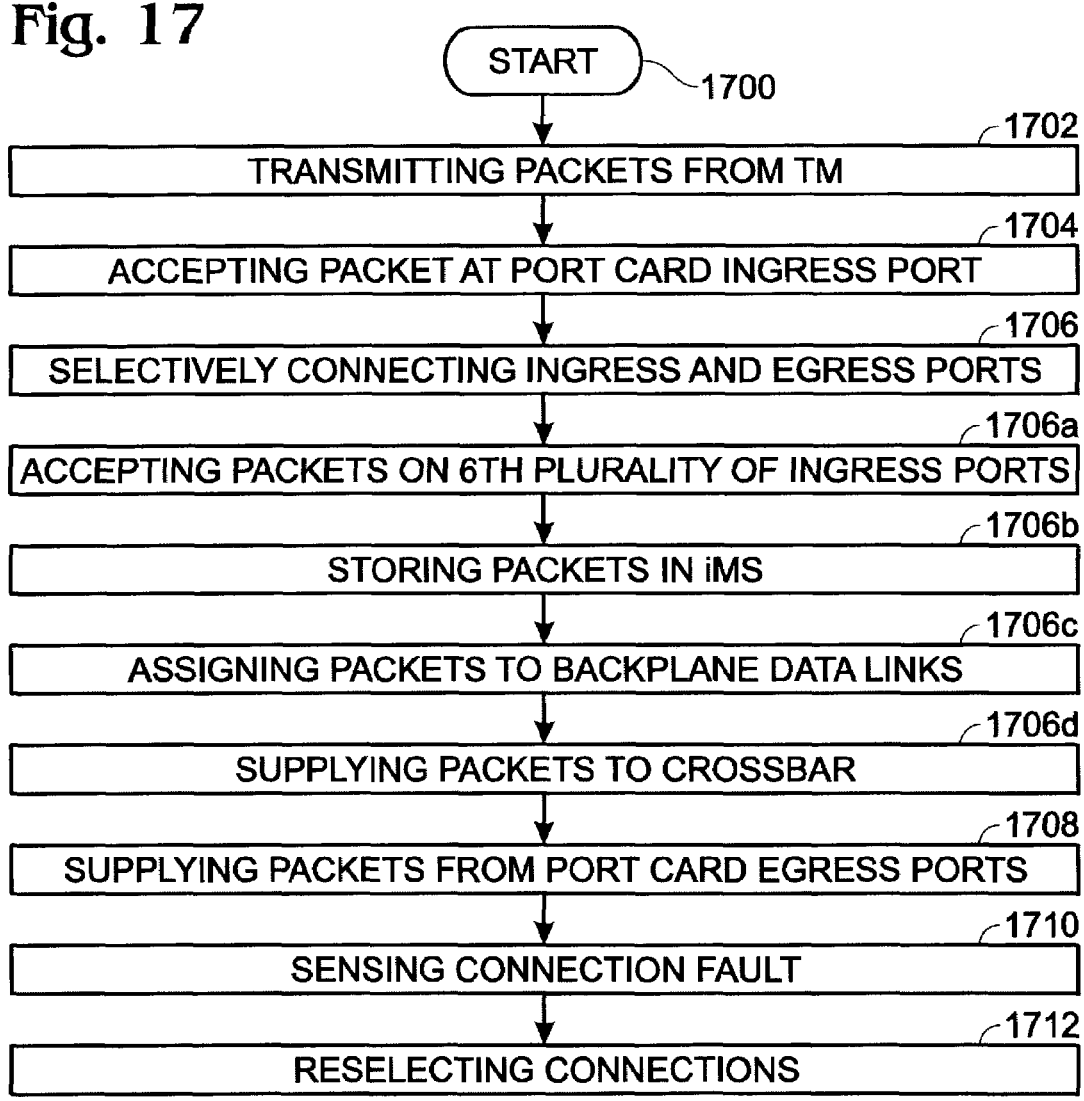
FIG. 17 is a flowchart illustrating the present invention method for tolerating data line faults in a packet communications network.

FIG. 17 is a flowchart illustrating the present invention method for tolerating data link faults in communications with a switch fabric. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 1700.

Step 1702 serially transmits information packets including a plurality of cells from at least one traffic manager (TM). Step 1704, at a switch fabric, accepts information packets at a plurality of port card ingress ports, the information packets addressing a plurality of destination port card egress ports. Step 1706 selectively connects port card ingress ports to port card egress ports. Step 1708 serially supplies information packets from a plurality of port card egress ports. Step 1710 senses a connection fault between the switch fabric and the TM. Step 1712, in response to sensing the fault, reselects connections between the switch fabric port card ports and the TM.

In some aspects of the method, selectively connecting port card ingress ports to port card egress ports in Step 1706 includes substeps. Step 1706a includes each port card accepting packets on a sixth plurality of ingress data links, through a corresponding sixth plurality of port card ingress ports, from at least one ingress TM (iTM). Step 1706b stores the accepted packets in a port card ingress memory subsystem (iMS). Step 1706c assigns packets to a second plurality of port card backplane data links. Step 1706d supplies assigned packets to a crossbar.

In other aspects, sensing a connection fault between the switch fabric and the TM in Step 1710 includes a first port card iMS receiving cells on an ingress port exceeding an error threshold. Then, reselecting connections between the port card ports and the TM in Step 1712 includes the first port card iMS sending a message to the iTM identifying the faulty ingress connection.

The egress function of the switch fabric works analogously to the ingress function. Although the substeps associated with the egress function are listed below, they are not included in the figure in the interest of clarity. In some aspects, selectively connecting port card ingress ports to port card egress ports in Step 1706 includes additional substeps. Step 1706e includes each port card accepting packets on a second plurality of port card backplane data links from crossbars. Step 1706f stores the accepted packets in a port card egress memory subsystem (eMS). Step 1706g assigns packets to a sixth plurality of port card egress ports. Step 1706h supplies assigned packets to selected port card egress ports from the eMS. Step 1706i includes each port card supplying packets on a sixth plurality of egress data links, through the corresponding sixth plurality of port card ports, to at least one egress TM (eTM).

In some aspects, reselecting connections between the switch fabric port card ports and the TM in Step 1712 includes a first port card iMS sending a message to the iTM identifying the faulty ingress connection, via communications through the first port card eMS and the eTM.

In other aspects, sensing a connection fault between the switch fabric and the TM in Step 1710 includes the eTM receiving cells from a first port card egress port exceeding an error threshold. Then, reselecting connections between the port card ports and the TM in Step 1712 includes the eTM sending a message to the first port card eMS identifying the faulty egress connection. In some aspects, reselecting connections between the switch fabric port card ports and the TM in Step 1712 includes the eTM sending a message to the first port card eMS identifying the faulty ingress connection, via communications with the first port card iMS and an iTM.

A system and method has been provided for tolerating data link faults in the connections between a switch fabric and network traffic managers. The invention has been described with a few examples that illustrate fault reporting, however, these examples do not illustrate every possible of linkage. Other variations and embodiments of the invention will occur to those skilled in the art.

We claim:

1. A method for tolerating data link faults in communications with a switch fabric, the method comprising:
   serially transmitting information packets including a plurality of cells from at least one traffic manager (TM);
   at a switch fabric, accepting information packets at a plurality of port card ingress ports, the information packets addressing a plurality of destination port card egress ports;
   selectively connecting port card ingress ports to port card egress ports;
   serially supplying information packets from a plurality of port card egress ports;
   sensing a connection fault between the switch fabric and the TM;
   in response to sensing the fault, reselecting connections between the switch fabric port card ports and the TM;
   wherein selectively connecting port card ingress ports to port card egress ports includes:
      each port card accepting packets on a sixth plurality of ingress data links, through a corresponding sixth plurality of port card ingress ports, from at least one iTM;
      storing the accepted packets in a port card ingress memory subsystem (iMS);
      assigning packets to a second plurality of port card backplane data links; and,
      supplying assigned packets to a crossbar;
   wherein sensing a connection fault between the switch fabric and the TM includes the first port card iMS receiving cells on an ingress port exceeding an error threshold; and,
   wherein reselecting connections between the port card ports and the TM includes the first port card iMS sending a message to the iTM identifying the faulty ingress connection.

2. The method of claim 1 wherein selectively connecting port card ingress ports to port card egress ports includes:
   each port card accepting packets on a second plurality of port card backplane data links from crossbars;
   storing the accepted packets in a port card egress memory subsystem (eMS);
   assigning packets to a sixth plurality of port card egress ports;
   supplying assigned packets to selected port card egress ports from the eMS; and,
   each port card supplying packets on a sixth plurality of egress data links, through the corresponding sixth plurality of port card ports, to an egress TM (eTM).

3. The method of claim 2 wherein reselecting connections between the switch fabric port card ports and the TM includes the first port card iMS sending a message to the iTM identifying the faulty ingress connection, via communications through the first port card eMS and the eTM.

4. The method of claim 2 wherein sensing a connection fault between the switch fabric and the TM includes the eTM receiving cells from a first port card egress port exceeding an error threshold; and,
   wherein reselecting connections between the port card ports and the TM includes the eTM sending a message to the first port card eMS identifying the faulty egress connection.

5. The method of claim 4 wherein reselecting connections between the switch fabric port card ports and the TM includes the eTM sending a message to the first port card eMS identifying the faulty ingress connection, via communications with the first port card iMS and an iTM.

6. A system for tolerating data link faults in communications with a switch fabric, the system comprising:
   at least one ingress traffic manager (iTM) with a plurality of ports serially transmitting information packets, including a plurality of cells, on a corresponding plurality of data links;
   a plurality of switch fabric port cards, each port card including:
      a plurality of ingress ports having connections on a corresponding plurality of ingress data links, to accept packets from iTM ports;
      a plurality of egress ports having connections on a corresponding plurality of serial data lines, to supply packets;
   a plurality of backplane data links to transfer packets between port cards;
      an ingress memory subsystem (iMS) having inputs connected to the ingress ports to receive fault messages, outputs to supply packets to ingress backplane data links, and a control link to communicate flow control information;
      an egress MS (eMS) having outputs connected to the egress ports to supply fault messages, inputs to accept packets on egress backplane data links, and a control link connected to the iMS to communicate flow control information;
   wherein the iTM reselects a port transmitting packets to the port card ingress ports in response to the received fault messages.

7. The system of claim 6 further comprising:
   at least one crossbar selectively connecting port card backplane data links.

8. The system of claim 6 wherein each port card accepts packets on a sixth plurality of ingress data links, through a corresponding sixth plurality of port card ingress ports; and, wherein each port card includes a second plurality of ingress backplane data links.

9. The system of claim 8 wherein the iMS includes a monitor with an input to receive packets from the ingress ports and an output to supply a flow control error message to the eMS in response to the packets errors exceeding an error threshold.

10. The system of claim 9 further comprising:
at least one egress traffic manager (eTM) with a plurality of ports serially accepting information packets on a corresponding plurality of data links; and,
wherein each port card supplies packets on a sixth plurality of egress data links, through a corresponding sixth plurality of port card egress ports, to the eTM.

11. The system of claim 10 wherein a first port card iMS sends a fault message to the iTM identifying the faulty ingress connection in a flow control fault message to the first port card eMS;
wherein the first port card eMS accepts the fault message from the iMS and transmits the fault message to the eTM in a packet header;
wherein the eTM accepts the fault message and transmits the fault message to the iTM; and,
wherein the iTM reselects ports communicating packets to the first port card ingress ports in response to the fault message.

12. The system of claim 11 wherein the eTM receives packet cells from the first port card egress port exceeding an error threshold; and sends a message to the first port card eMS identifying the faulty egress connection.

13. The system of claim 12 wherein the eTM sends a fault message to the iTM identifying the port card faulty egress connection;
wherein the iTM accepts the fault massage and sends the fault message to the first port card iMS in a packet header, identifying the faulty ingress connection;
wherein the first port card iMS accepts the fault message and transmits a flow control fault message to the first port card eMS; and,
wherein the first port card eMS receives the fault message and reselects egress ports communicating packets to the eTM in response to the fault message.

14. A system for tolerating data link faults in communications with a switch fabric, the system comprising:
at least one egress traffic manager (eTM) with a plurality of ports serially accepting information packets, including a plurality of cells, on a corresponding plurality of data links;
a plurality of switch fabric port cards, each port card including:
a plurality of egress ports having connections on a corresponding plurality of egress data links, to supply packets to the eTM;
a plurality of ingress ports having connections on a corresponding plurality of ingress data links, and operatively connected to the eTM to accept packets including error messages;
a plurality of backplane data links to transfer packets between port cards;
an ingress memory subsystem (iMS) having inputs connected to the ingress ports to receive fault messages, outputs to supply packets to ingress backplane data links, and a control link to communicate flow control information;
an egress MS (eMS) having outputs connected to the egress ports to supply fault messages, inputs to accept packets on egress backplane data links, and a control link connected to the iMS to communicate flow control information; and,
wherein the eMS reselects a port transmitting packets to the eTM in response to the received fault messages.

* * * * *